(12) United States Patent
Zhao et al.

(10) Patent No.: US 11,985,303 B2
(45) Date of Patent: May 14, 2024

(54) CONTEXT MODELING METHOD AND APPARATUS FOR FLAG

(71) Applicant: Huawei Technologies Co., Ltd., Shenzhen (CN)

(72) Inventors: Yin Zhao, Hangzhou (CN); Lian Zhang, Shenzhen (CN); Haitao Yang, Shenzhen (CN); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 17/356,166

(22) Filed: Jun. 23, 2021

(65) Prior Publication Data

US 2021/0329225 A1 Oct. 21, 2021

Related U.S. Application Data

(63) Continuation of application No. PCT/CN2019/127682, filed on Dec. 23, 2019.

(Continued)

(51) Int. Cl.
*H04N 19/105* (2014.01)
*H04N 19/13* (2014.01)
(Continued)

(52) U.S. Cl.
CPC ........... *H04N 19/105* (2014.11); *H04N 19/13* (2014.11); *H04N 19/176* (2014.11); *H04N 19/46* (2014.11)

(58) Field of Classification Search
CPC .... H04N 19/105; H04N 19/13; H04N 19/176; H04N 19/46
(Continued)

(56) References Cited

U.S. PATENT DOCUMENTS

2013/0195200 A1    8/2013  Nguyen et al.
2014/0269928 A1*   9/2014  Piao ................ H04N 19/91
                                            375/240.18
(Continued)

FOREIGN PATENT DOCUMENTS

CN       1980395 A       6/2007
CN     103929642 A       7/2014
(Continued)

OTHER PUBLICATIONS

International Telecommunication Union, "Line Transmission of Non-Telephone Signals", Video Codec for Audiovisual Services AT p × 64 kbits, ITU-T H.261 (Mar. 1993), 29 pages.
(Continued)

*Primary Examiner* — Joseph G Ustaris
*Assistant Examiner* — Jimmy S Lee
(74) *Attorney, Agent, or Firm* — Slater Matsil, LLP

(57) ABSTRACT

A context modeling method includes: determining, for a current block, whether a first preset condition is satisfied and whether a second preset condition is satisfied, where the first preset condition is a preset condition related to a first neighboring block neighboring to the current block in a first direction, the second preset condition is a preset condition related to a second neighboring block neighboring to the current block in a second direction; determining a subclass index of a context model of a first flag of the current block based on the height and the width of the current block; and determining the context model of the first flag of the current block based on a satisfaction status of the first preset condition, a satisfaction status of the second preset condition, and the subclass index of the context model of the first flag.

20 Claims, 13 Drawing Sheets

Related U.S. Application Data

(60) Provisional application No. 62/784,690, filed on Dec. 24, 2018.

(51) Int. Cl.
  *H04N 19/176* (2014.01)
  *H04N 19/46* (2014.01)

(58) Field of Classification Search
  USPC .................................................... 375/240.02
  See application file for complete search history.

(56) References Cited

U.S. PATENT DOCUMENTS

| | | | | |
|---|---|---|---|---|
| 2016/0353113 | A1* | 12/2016 | Zhang | H04N 19/159 |
| 2017/0332095 | A1 | 11/2017 | Feng et al. | |
| 2018/0070110 | A1* | 3/2018 | Chuang | H04N 19/134 |
| 2018/0332288 | A1 | 11/2018 | Hsiang et al. | |
| 2018/0338144 | A1 | 11/2018 | Nam et al. | |
| 2020/0221138 | A1* | 7/2020 | Lee | H04N 19/139 |

FOREIGN PATENT DOCUMENTS

| | | |
|---|---|---|
| CN | 104081773 A | 10/2014 |
| CN | 106507106 A | 3/2017 |
| CN | 108432248 A | 8/2018 |
| CN | 108605130 A | 9/2018 |
| WO | 2011103678 A1 | 9/2011 |

OTHER PUBLICATIONS

International Telecommunication Union, "Series H: Audiovisual and Multimedia Systems, Infrastructure of audiovisual services—Coding of moving video—Video coding for low bit rate communication", ITU-T H.263 (Jan. 2005), 226 pages.

International Telecommunication Union, "Series H: Audiovisual and Multimedia Systems, Infrastructure of audiovisual services—Coding of moving video, Advanced video coding for generic audiovisual services", ITU-T H.264 (Apr. 2017), 812 pages.

International Telecommunication Union, "Series H: Audiovisual and Multimedia Systems Infrastructure of audiovisual services—Coding of moving video, High efficiency video coding", ITU-T H.265(Feb. 2018), 692 pages.

* cited by examiner

CONTEXT MODELING METHOD AND APPARATUS FOR FLAG

CROSS-REFERENCE TO RELATED APPLICATIONS

This application is a continuation of International Application No. PCT/CN2019/127682, filed on Dec. 23, 2019, which claims priority to U.S. Provisional Patent Application No. 62/784,690, filed on Dec. 24, 2018. The disclosures of the aforementioned applications are hereby incorporated by reference in their entireties.

TECHNICAL FIELD

Embodiments of this application relate to the video coding field, and in particular, to a context modeling method and apparatus for a flag.

BACKGROUND

In the field of video coding technologies, a syntax element is a very important factor in a coding process. The syntax element may include some flags in the coding process. Coding for a picture includes coding for the syntax element.

Encoding and decoding for the flag are implemented by using an entropy coding technology. Specifically, a probability value of a bin corresponding to the flag is determined according to a probability model (which is referred to as a context model of the flag below) of the bin, and then the probability value of the bin is encoded and decoded, to implement encoding and decoding for the flag. Selection of a probability model of the syntax element greatly affects entropy coding efficiency. A skip mode flag (denoted as cu_skip_flag[x0][y0]), which is one of syntax elements, is used as an example. Currently, on an encoder side or a decoder side, an index of a context model of a skip mode flag of a current picture block may be determined based on a status of a skip mode flag of a neighboring picture block of the current picture block, and then encoding or decoding of the skip mode flag of the current picture block is completed based on the context model corresponding to the index of the context model.

However, in the foregoing method, accuracy of the context model that is of the corresponding flag of the current picture block and that is determined based on only the status of the flag of the neighboring picture block of the current picture block may be relatively low. As a result, coding efficiency is relatively low.

SUMMARY

Embodiments of this application provide a context modeling method and apparatus for a flag, so that accuracy of determining a context model of a flag can be improved to some extent, thereby improving coding performance.

According to a first aspect, an embodiment of this application provides a context modeling method for a flag, including: determining, for a current block, whether a first preset condition is satisfied and whether a second preset condition is satisfied, where the first preset condition is a preset condition related to a first neighboring block neighboring to the current block in a first direction, the second preset condition is a preset condition related to a second neighboring block neighboring to the current block in a second direction, and the first direction is perpendicular to the second direction; determining a subclass index of a context model of a first flag of the current block based on the height and the width of the current block; and determining the context model of the first flag of the current block based on a satisfaction status of the first preset condition, a satisfaction status of the second preset condition, and the subclass index of the context model of the first flag.

When the first direction is a horizontal leftward direction, the first neighboring block is a neighboring block on the left of the current block. When the second direction is a vertical upward direction, the second neighboring block is a neighboring block above the current block. The first neighboring block and the second neighboring block are spatially neighboring blocks of the current block. It should be noted that the first neighboring block covers a preset position relative to the current block in the first direction, and the second neighboring block covers a preset position relative to the current block in the second direction.

For example, condL represents the first preset condition, a syntax structure of the first preset condition is "cu_skip_flag[xNbL][y0][yNbL]&&available", condA represents the second preset condition, and a syntax structure of the second preset condition is "cu_skip_flag[xNbA][y0][yNbA]&&available".

According to the context modeling method for a flag that is provided in this embodiment of this application, in addition to context information of the current block (for example, a first flag of the first neighboring block and a first flag of the second neighboring block), information about the current block is further used (for example, the subclass index is determined based on the width and the height of the current block) to determine the context model of the first flag of the current block. In this way, accuracy of determining the context model of the flag can be improved to some extent, so that coding performance is improved.

According to the first aspect, in a possible implementation, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

For example, a skip mode flag cu_skip_flag is used as an example. cu_skip_flag[x0][y0] of the current block is used to indicate whether a skip mode is used for the current block. cu_skip_flag[x0][y0]==1 indicates that the skip mode is used for the current block, and cu_skip_flag[x0][y0]==0 indicates that the skip mode is not used for the current block.

That the first neighboring block is available means that the first neighboring block is located in a picture (or referred to as a video frame) region to which the current block belongs and the first neighboring block has been reconstructed (that is, encoded or decoded). If the first neighboring block is not located in a picture region to which the current block belongs or the first neighboring block has not been reconstructed, the first neighboring block is not available. Likewise, that the second neighboring block is available means that the second neighboring block is located in the picture region to which the current block belongs and the second neighboring block has been reconstructed. If the second neighboring block is not located in the picture region to which the current block belongs or the second neighboring block has not been reconstructed, the second neighboring block is not available.

It should be understood that there may be another condition for determining whether a neighboring block is available. For example, if the neighboring block and the current block are in a same slice, the neighboring block is available. If the neighboring block and the current block are not in a same slice, the neighboring block is not available.

In this embodiment of this application, there are a plurality of methods for determining whether a picture block has been reconstructed. For example, in H.265, z-order indices (z-order index) of the current block and the neighboring block may be compared to determine whether the neighboring block has been reconstructed. Alternatively, a mask indicating whether each region of a picture is reconstructed may be generated. After a picture block is reconstructed, a corresponding region on the mask is marked as reconstructed. Whether the neighboring block has been reconstructed is determined by querying a mask value corresponding to the neighboring block.

According to the first aspect, in a possible implementation, a method for determining the context model of the first flag of the current block based on the satisfaction status of the first preset condition, the satisfaction status of the second preset condition, and the subclass index of the context model of the first flag may include: determining an index of the context model of the first flag of the current block based on the satisfaction status of the first preset condition, the satisfaction status of the second preset condition, and the subclass index of the context model of the first flag, where the index of the context model of the first flag satisfies: ctxInc=n_conL+n_conA+X*a, where ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, X represents the subclass index of the context model of the first flag, a is a positive integer, and * represents multiplication.

It should be noted that, in this embodiment of this application, the subclass index is merely a name used for model index differentiation, and has no special meaning. In the foregoing description, a is a coefficient that is a positive integer, and a value of a may be 3. Certainly, a may alternatively have another value. This is not limited in this embodiment of this application.

According to the first aspect, in a possible implementation, the determining a subclass index of a context model of a first flag based on the height and the width of the current block includes: obtaining an area of the current block based on the height and the width of the current block; and determining the subclass index of the context model of the first flag based on the area of the current block and a preset area threshold.

According to the first aspect, in a possible implementation, the preset area threshold includes a first threshold and a second threshold, and the second threshold is greater than the first threshold. In this case, a method for determining the subclass index of the context model of the first flag based on the area of the current block and the preset area threshold includes: when the area of the current block is greater than the second threshold, determining that the subclass index of the context model of the first flag is 0; or when the area of the current block is greater than or equal to the first threshold and less than or equal to the second threshold, determining that the subclass index of the context model of the first flag is 1; or when the area of the current block is less than the first threshold, determining that the subclass index of the context model of the first flag is 2.

The first threshold may be 128, 256, or 64, and the second threshold may be 1024, 2048, or 512. Certainly, the first threshold and the second threshold may alternatively be other values. This is not limited in this embodiment of this application.

According to the first aspect, in a possible implementation, the preset area threshold includes a third threshold. In this case, the determining the subclass index of the context model of the first flag based on the area of the current block and a preset area threshold includes: when the area of the current block is greater than the third threshold, determining that the subclass index of the context model of the first flag is 0; or when the area of the current block is less than or equal to the third threshold, determining that the subclass index of the context model of the first flag is 1.

Optionally, in S1022, the third threshold may be 1024, 2048, or 512. Certainly, the third threshold may alternatively be another value. This is not limited in this embodiment of this application.

According to the first aspect, in a possible implementation, the first flag includes one of the following flags: a skip mode flag, a prediction mode flag, a merge mode flag, an affine merge mode flag, an affine advanced motion vector prediction mode, or an adaptive motion vector resolution mode.

For example, the skip mode flag may be denoted as cu_skip_flag, the prediction mode flag is denoted as pred_mode_flag, the merge mode flag is denoted as merge_flag, the affine merge mode flag is denoted as merge_affine_flag, the affine advanced motion vector prediction (affine AMVP) mode flag is denoted as inter_affine_flag, and the adaptive motion vector resolution (AMVR) mode flag is denoted as amvr_flag. The first flag may alternatively be a flag other than the foregoing flags. This is not limited in this embodiment of this application.

According to the first aspect, in a possible implementation, the first direction is a horizontal leftward direction, and the second direction is a vertical upward direction.

It should be noted that the first direction may alternatively be a horizontal rightward direction, and the second direction may alternatively be a vertical downward direction. Specifically, the first direction and the second direction may be determined according to an actual coding rule. This is not limited in this embodiment of this application.

According to a second aspect, an embodiment of this application provides a context modeling method for a flag, including: determining whether a current block satisfies a preset condition, where the preset condition is that at least one of a first preset condition and a second preset condition is satisfied, the first preset condition is a preset condition related to a first neighboring block neighboring to the current block in a first direction, the second preset condition is a preset condition related to a second neighboring block neighboring to the current block in a second direction, and the first direction is perpendicular to the second direction; and if the current block does not satisfy the preset condition, determining a first index of a context model of a first flag of the current block based on the height and the width of the current block, and determining the context model of the first flag of the current block based on a satisfaction status of the first preset condition, a satisfaction status of the second preset condition, and the first index of the context model of the first flag; or if the current block satisfies the preset condition, determining a context model of a first flag of the current block based on a satisfaction status of the first preset condition and a satisfaction status of the second preset condition.

The preset condition is that the at least one of the first preset condition and the second preset condition is satisfied. It may be understood that when one or both of the first preset condition and the second preset condition is/are satisfied, the current block satisfies the preset condition. Otherwise (that is, when neither the first preset condition nor the second preset condition is satisfied), the current block does not satisfy the preset condition.

In the context modeling method for a flag according to this embodiment of this application, for the current block, whether the current block satisfies the preset condition (the preset condition is at least one of the first preset condition and the second preset condition) is determined. When the current block does not satisfy the preset condition, the context model of the first flag is determined based on the satisfaction status of the first preset condition, the satisfaction status of the second preset condition, and the first index of the context model of the first flag. When the current block satisfies the preset condition, the context model of the first flag is determined based on the satisfaction status of the first preset condition and the satisfaction status of the second preset condition. In this way, accuracy of determining the context model of the flag can be improved to some extent, so that coding performance is improved.

According to the second aspect, in a possible implementation, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

According to the second aspect, in a possible implementation, a method for determining the context model of the first flag of the current block based on the satisfaction status of the first preset condition, the satisfaction status of the second preset condition, and the first index of the context model of the first flag includes: determining an index of the context model of the first flag of the current block based on the satisfaction status of the first preset condition, the satisfaction status of the second preset condition, and the first index of the context model of the first flag, where the index of the context model of the first flag satisfies: ctxInc=n_conL+n_conA+Y, where ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, and Y represents the first index of the context model of the first flag.

It should be noted that, in this embodiment of this application, the first index is merely a name used for model index differentiation, and has no special meaning.

In actual application, for some flags (for example, the foregoing pred_mode_flag), because a probability that both a flag of the first neighboring block of the current block and a flag of the second neighboring block of the current block are 0 is relatively high, a probability that an index of a context model of a flag of the current block is 0 is also relatively high, and the model may be inaccurate. According to the foregoing method, when the current block does not satisfy the preset condition, the first index is added for model optimization, so that decoding efficiency can be improved.

According to the second aspect, in a possible implementation, a method for determining the first index of the context model of the first flag of the current block based on the height and the width of the current block includes: obtaining an area of the current block based on the height and the width of the current block; and determining the first index of the context model of the first flag based on the area of the current block and a preset area threshold.

According to the second aspect, in a possible implementation, the preset area threshold includes a first threshold and a second threshold. In this case, a method for determining the first index of the context model of the first flag based on the area of the current block and the preset area threshold includes: when the area of the current block is greater than the second threshold, determining that the first index of the context model of the first flag is 0; or when the area of the current block is greater than or equal to the first threshold and less than or equal to the second threshold, determining that the first index of the context model of the first flag is 3; or when the area of the current block is less than the first threshold, determining that the first index of the context model of the first flag is 4.

The first threshold may be 128, 256, or 64, and the second threshold may be 1024, 2048, or 512. Certainly, the first threshold and the second threshold may alternatively be other values. This is not limited in this embodiment of this application. In addition, the first threshold and the second threshold are not related to the first threshold and the second threshold in the first aspect.

According to the second aspect, in a possible implementation, the preset area threshold includes a third threshold. In this case, a method for determining the first index of the context model of the first flag based on the area of the current block and the preset area threshold includes: when the area of the current block is greater than the third threshold, determining that the first index of the context model of the first flag is 0; or when the area of the current block is less than or equal to the third threshold, determining that the first index of the context model of the first flag is 1.

The third threshold may be 1024, 2048, or 512. Certainly, the third threshold may alternatively be another value. This is not limited in this embodiment of this application. In addition, the third threshold is not related to the third threshold in the first aspect.

According to the second aspect, in a possible implementation, a method for determining the context model of the first flag based on the satisfaction status of the first preset condition and the satisfaction status of the second preset condition includes: determining an index of the context model of the first flag based on the satisfaction status of the first preset condition and the satisfaction status of the second preset condition, where the index of the context model of the first flag satisfies: ctxInc=n_conL+n_conA, where ctxInc represents the index of the context model of the first flag, n_conL is 1 when the first preset condition is satisfied, or n_conL is 0 when the first preset condition is not satisfied, and n_conA is 1 when the second preset condition is satisfied, or n_conA is 0 when the second preset condition is not satisfied.

According to the second aspect, in a possible implementation, the first flag includes one of the following flags: a skip mode flag, a prediction mode flag, a merge mode flag, an affine merge mode flag, an affine advanced motion vector prediction mode, or an adaptive motion vector resolution mode.

According to the second aspect, in a possible implementation, the first direction is a horizontal leftward direction, and the second direction is a vertical upward direction.

For descriptions of other related content in the second aspect and the possible implementations of the second aspect, refer to the descriptions of the related content in the first aspect and the possible implementations of the first aspect. Details are not described herein again.

According to a third aspect, an embodiment of this application provides a context modeling method for a flag, including: determining whether a current block satisfies a preset condition, where the preset condition is that at least one of a first preset condition and a second preset condition is satisfied, the first preset condition is a preset condition related to a first neighboring block neighboring to the current block in a first direction, the second preset condition is a preset condition related to a second neighboring block neighboring to the current block in a second direction, and the first direction is perpendicular to the second direction; and if the current block satisfies the preset condition, determining a context model of a first flag of the current block based on a satisfaction status of the first preset condition and a satisfaction status of the second preset condition; or if the current block does not satisfy the preset condition, determining a context model of a first flag of the current block based on the height and the width of the current block.

According to the third aspect, in a possible implementation, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

According to the third aspect, in a possible implementation, a method for determining the context model of the first flag of the current block based on the height and the width of the current block includes: obtaining an area of the current block based on the height and the width of the current block; and determining an index of the context model of the first flag based on the area of the current block and a preset area threshold.

According to the third aspect, in a possible implementation, the preset area threshold includes a first threshold and a second threshold, and a method for determining the index of the context model of the first flag based on the area of the current block and the preset area threshold includes: when the area of the current block is greater than the second threshold, determining that the index of the context model of the first flag is 0; or when the area of the current block is greater than or equal to the first threshold and less than or equal to the second threshold, determining that the index of the context model of the first flag is 3; or when the area of the current block is less than the first threshold, determining that the index of the context model of the first flag is 4.

According to the third aspect, in a possible implementation, the first threshold is 64.

According to the third aspect, in a possible implementation, the first flag includes one of the following flags: a skip mode flag, a prediction mode flag, a merge mode flag, an affine merge mode flag, an affine advanced motion vector prediction mode, or an adaptive motion vector resolution mode.

According to the third aspect, in a possible implementation, the first direction is a horizontal leftward direction, and the second direction is a vertical upward direction.

For descriptions of other related content in the third aspect and the possible implementations of the third aspect, refer to the descriptions of the related content in the first aspect and the second aspect, and the possible implementations of the first aspect and the second aspect. Details are not described herein again.

According to a fourth aspect, an embodiment of this application provides a context modeling apparatus for a flag, including several functional units configured to implement any method in the first aspect. For example, the context modeling apparatus for a flag may include: a condition determining module, configured to determine whether a first preset condition is satisfied and whether a second preset condition is satisfied, where the first preset condition is a preset condition related to a first neighboring block neighboring to a current block in a first direction, the second preset condition is a preset condition related to a second neighboring block neighboring to the current block in a second direction, and the first direction is perpendicular to the second direction; an index determining module, configured to determine a subclass index of a context model of a first flag of the current block based on the height and the width of the current block; and a model determining module, configured to determine the context model of the first flag of the current block based on a satisfaction status of the first preset condition, a satisfaction status of the second preset condition, and the subclass index of the context model of the first flag.

According to the fourth aspect, in a possible implementation, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

According to the fourth aspect, in a possible implementation, the model determining module is specifically configured to determine an index of the context model of the first flag of the current block based on the satisfaction status of the first preset condition, the satisfaction status of the second preset condition, and the subclass index of the context model of the first flag, where the index of the context model of the first flag satisfies: ctxInc=n_conL+n_conA+X*a, where ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, X represents the subclass index of the context model of the first flag, a is a positive integer, and * represents multiplication.

According to the fourth aspect, in a possible implementation, the index determining module is specifically configured to: obtain an area of the current block based on the height and the width of the current block; and determine the subclass index of the context model of the first flag based on the area of the current block and a preset area threshold.

According to the fourth aspect, in a possible implementation, the preset area threshold includes a first threshold and a second threshold. In this case, the index determining module is specifically configured to: when the area of the current block is greater than the second threshold, determine that the subclass index of the context model of the first flag is 0; or when the area of the current block is greater than or equal to the first threshold and less than or equal to the second threshold, determine that the subclass index of the context model of the first flag is 1; or when the area of the current block is less than the first threshold, determine that the subclass index of the context model of the first flag is 2.

According to the fourth aspect, in a possible implementation, the preset area threshold includes a third threshold. In this case, the index determining module is specifically configured to: when the area of the current block is greater than the third threshold, determine that the subclass index of the context model of the first flag is 0; or when the area of the current block is less than or equal to the third threshold, determine that the subclass index of the context model of the first flag is 1.

According to the fourth aspect, in a possible implementation, the first flag includes one of the following flags: a skip mode flag, a prediction mode flag, a merge mode flag, an affine merge mode flag, an affine advanced motion vector prediction mode, or an adaptive motion vector resolution mode.

According to the fourth aspect, in a possible implementation, the first direction is a horizontal leftward direction, and the second direction is a vertical upward direction.

According to a fifth aspect, an embodiment of this application provides a context modeling apparatus for a flag, including several functional units configured to implement any method in the second aspect. For example, the context modeling apparatus for a flag may include: a condition determining module, configured to determine whether a current block satisfies a preset condition, where the preset condition is that at least one of a first preset condition and a second preset condition is satisfied, the first preset condition is a preset condition related to a first neighboring block neighboring to the current block in a first direction, the second preset condition is a preset condition related to a second neighboring block neighboring to the current block in a second direction, and the first direction is perpendicular to the second direction; an index determining module, configured to: if the current block does not satisfy the preset condition, determine a first index of a context model of a first flag of the current block based on the height and the width of the current block; and a model determining module, configured to determine the context model of the first flag of the current block based on a satisfaction status of the first preset condition, a satisfaction status of the second preset condition, and the first index of the context model of the first flag. Alternatively, the model determining module is configured to: if the current block satisfies the preset condition, determine a context model of a first flag of the current block based on a satisfaction status of the first preset condition and a satisfaction status of the second preset condition.

According to the fifth aspect, in a possible implementation, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

According to the fifth aspect, in a possible implementation, the model determining module is specifically configured to determine an index of the context model of the first flag of the current block based on the satisfaction status of the first preset condition, the satisfaction status of the second preset condition, and the first index of the context model of the first flag, where the index of the context model of the first flag satisfies: ctxInc=n_conL+n_conA+Y, where ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, and Y represents the first index of the context model of the first flag.

According to the fifth aspect, in a possible implementation, the index determining module is specifically configured to: obtain an area of the current block based on the height and the width of the current block; and determine the first index of the context model of the first flag based on the area of the current block and a preset area threshold.

According to the fifth aspect, in a possible implementation, the preset area threshold includes a first threshold and a second threshold. In this case, the index determining module is specifically configured to: when the area of the current block is greater than the second threshold, determine that the first index of the context model of the first flag is 0; or when the area of the current block is greater than or equal to the first threshold and less than or equal to the second threshold, determine that the first index of the context model of the first flag is 3; or when the area of the current block is less than the first threshold, determine that the first index of the context model of the first flag is 4.

According to the fifth aspect, in a possible implementation, the preset area threshold includes a third threshold. In this case, the index determining module is specifically configured to: when the area of the current block is greater than the third threshold, determine that the first index of the context model of the first flag is 0; or when the area of the current block is less than or equal to the third threshold, determine that the first index of the context model of the first flag is 1.

According to the fifth aspect, in a possible implementation, the model determining module is specifically configured to determine an index of the context model of the first flag based on the satisfaction status of the first preset condition and the satisfaction status of the second preset condition, where the index of the context model of the first flag satisfies: ctxInc=n_conL+n_conA, where ctxInc represents the index of the context model of the first flag, n_conL is 1 when the first preset condition is satisfied, or n_conL is 0 when the first preset condition is not satisfied, and n_conA is 1 when the second preset condition is satisfied, or n_conA is 0 when the second preset condition is not satisfied.

According to the fifth aspect, in a possible implementation, the first flag includes one of the following flags: a skip mode flag, a prediction mode flag, a merge mode flag, an affine merge mode flag, an affine advanced motion vector prediction mode, or an adaptive motion vector resolution mode.

According to the fifth aspect, in a possible implementation, the first direction is a horizontal leftward direction, and the second direction is a vertical upward direction.

According to a sixth aspect, a context modeling apparatus for a flag is provided, including several functional units configured to implement any method in the third aspect. For example, the context modeling apparatus for a flag includes: a condition determining module, configured to determine whether a current block satisfies a preset condition, where the preset condition is that at least one of a first preset condition and a second preset condition is satisfied, the first preset condition is a preset condition related to a first neighboring block neighboring to the current block in a first direction, the second preset condition is a preset condition related to a second neighboring block neighboring to the current block in a second direction, and the first direction is perpendicular to the second direction; and a model determining module, configured to: if the current block satisfies the preset condition, determine a context model of a first flag of the current block based on a satisfaction status of the first preset condition and a satisfaction status of the second preset condition. Alternatively, the model determining module is configured to: if the current block does not satisfy the preset condition, determine a context model of a first flag of the current block based on the height and the width of the current block.

According to the sixth aspect, in a possible implementation, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

According to the sixth aspect, in a possible implementation, the model determining module is specifically configured to: obtain an area of the current block based on the height and the width of the current block; and determine an index of the context model of the first flag based on the area of the current block and a preset area threshold.

According to the sixth aspect, in a possible implementation, the preset area threshold includes a first threshold and a second threshold. In this case, the model determining module is specifically configured to: when the area of the current block is greater than the second threshold, determine that the index of the context model of the first flag is 0; or when the area of the current block is greater than or equal to the first threshold and less than or equal to the second threshold, determine that the index of the context model of the first flag is 3; or when the area of the current block is less than the first threshold, determine that the index of the context model of the first flag is 4.

According to the sixth aspect, in a possible implementation, the first threshold is 64.

According to the sixth aspect, in a possible implementation, the first flag includes one of the following flags: a skip mode flag, a prediction mode flag, a merge mode flag, an affine merge mode flag, an affine advanced motion vector prediction mode, or an adaptive motion vector resolution mode.

According to the sixth aspect, in a possible implementation, the first direction is a horizontal leftward direction, and the second direction is a vertical upward direction.

According to a seventh aspect, an embodiment of this application provides a context modeling apparatus for a flag. The apparatus includes: a prediction unit, configured to predict a current coding block to obtain a predicted pixel value of the current coding block; the context modeling apparatus for a flag according to any one of the fourth aspect and the possible implementations of the fourth aspect, the context modeling apparatus for a flag according to any one of the fifth aspect and the possible implementations of the fifth aspect, or the context modeling apparatus for a flag according to any one of the sixth aspect and the possible implementations of the sixth aspect, where the context modeling apparatus is a part of an entropy encoding unit, and the context modeling apparatus for a flag is configured to determine a context model of a first flag of the current coding block, and encode the first flag into a bitstream based on the context model; and a reconstruction module, configured to reconstruct the current coding block based on the predicted pixel value.

According to an eighth aspect, an embodiment of this application provides a context modeling apparatus for a flag. The apparatus includes: the context modeling apparatus for a flag according to any one of the fourth aspect and the possible implementations of the fourth aspect, the context modeling apparatus for a flag according to any one of the fifth aspect and the possible implementations of the fifth aspect, or the context modeling apparatus for a flag according to any one of the sixth aspect and the possible implementations of the sixth aspect, where the context modeling apparatus is a part of an entropy decoding unit, and the context modeling apparatus for a flag is configured to: determine a context model of a first flag of a current coding block, and decode a bitstream to obtain the first flag based on the context model; a prediction unit, configured to predict the current coding block, to obtain a predicted pixel value of the current coding block; and a reconstruction module, configured to reconstruct the current coding block based on the predicted pixel value.

According to a ninth aspect, an embodiment of this application provides an encoding device, including a non-volatile memory and a processor that are coupled to each other, where the processor invokes program code stored in the memory to perform some or all steps of any method in the first aspect, the second aspect, or the third aspect.

According to a tenth aspect, an embodiment of this application provides a decoding device, including a non-volatile memory and a processor that are coupled to each other, where the processor invokes program code stored in the memory to perform some or all steps of any method in the first aspect, the second aspect, or the third aspect.

According to an eleventh aspect, an embodiment of this application provides a computer-readable storage medium. The computer-readable storage medium stores program code, and the program code includes instructions used to perform some or all steps of any method in the first aspect, the second aspect, or the third aspect.

According to a twelfth aspect, an embodiment of this application provides a computer program product. When the computer program product is run on a computer, the computer is enabled to perform some or all steps of any method in the first aspect, the second aspect, or the third aspect.

It should be understood that for beneficial effects achieved by the technical solutions in the second aspect to the twelfth aspect of this application and the corresponding feasible implementations, refer to the technical effects of the first aspect, the second aspect, the third aspect, and the corresponding feasible implementations thereof. Details are not described herein again.

It can be learned that in the context modeling method for a flag according to the embodiments of this application, accuracy of determining a context model of a flag can be improved to some extent, so that coding performance is improved.

BRIEF DESCRIPTION OF THE DRAWINGS

To describe the technical solutions in the embodiments of this application more clearly, the following describes the accompanying drawings for describing the embodiments of this application.

DETAILED DESCRIPTION OF ILLUSTRATIVE EMBODIMENTS

Figure 1A:
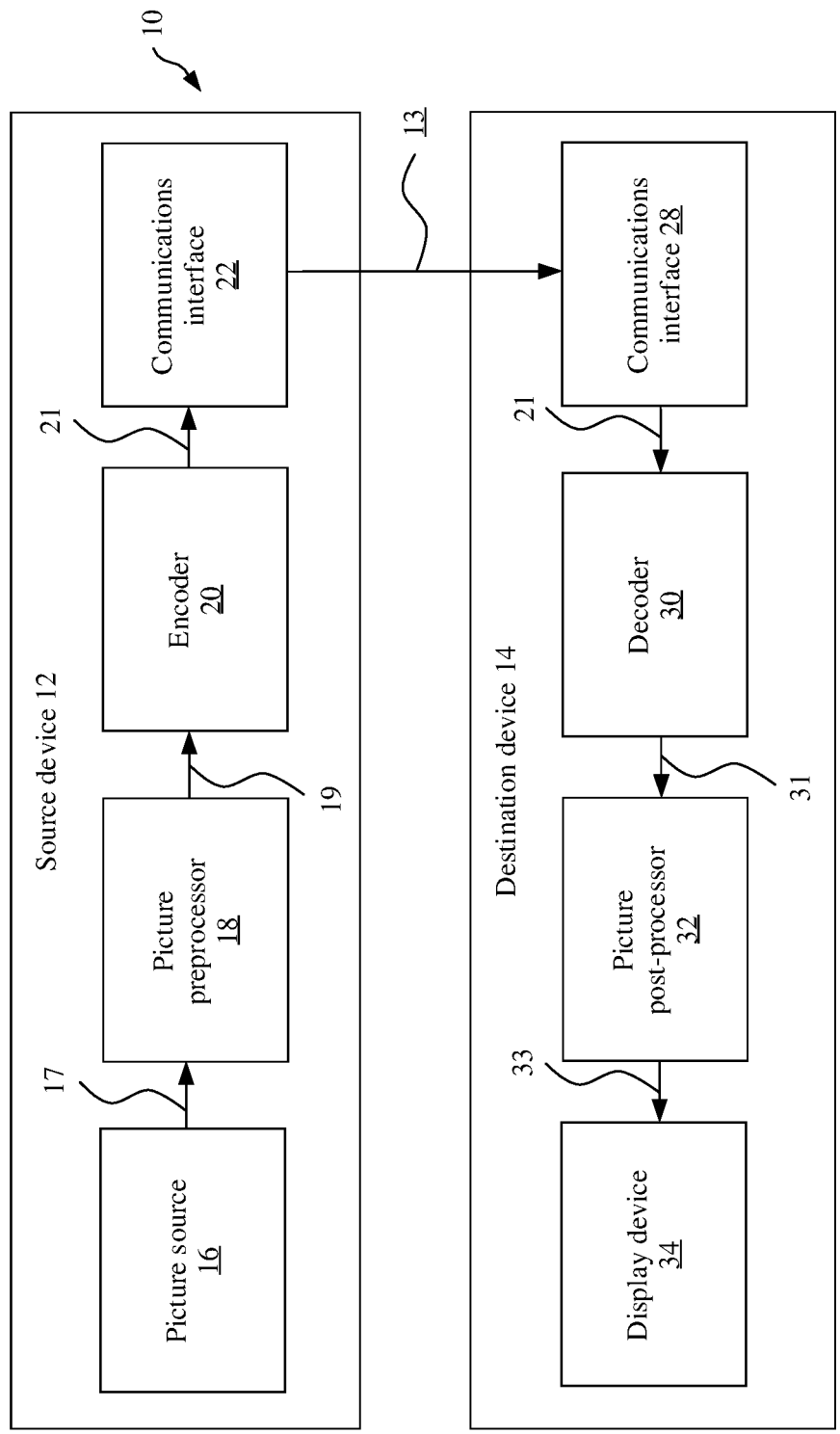
FIG. 1A is a block diagram of an example of a video encoding and decoding system 10 according to an embodiment of this application.

The following describes the embodiments of this application with reference to the accompanying drawings in the embodiments of this application. In the following description, reference is made to the accompanying drawings that form a part of this disclosure and show, by way of illustration, specific aspects of the embodiments of this application or specific aspects in which the embodiments of this application may be used. It should be understood that the embodiments of this application may be used in other aspects, and may include structural or logical changes not depicted in the accompanying drawings. Therefore, the following detailed description shall not be taken in a limiting sense, and the scope of this application is defined by the appended claims. For example, it should be understood that disclosed content in combination with a described method may also hold true for a corresponding device or system configured to perform the method and vice versa. For example, if one or more specific method steps are described, a corresponding device may include one or more units such as functional units to perform the described one or more method steps (for example, one unit performing the one or more steps, or a plurality of units each performing one or more of the plurality of steps), even if such one or more units are not explicitly described or illustrated in the accompanying drawings. In addition, for example, if a specific apparatus is described based on one or more units such as functional units, a corresponding method may include a step used to perform functionality of the one or more units (for example, one step used to perform the functionality of the one or more units, or a plurality of steps each used to perform functionality of one or more of a plurality of units), even if such one or more steps are not explicitly described or illustrated in the accompanying drawings. Further, it should be understood that features of various example embodiments and/or aspects described in this specification may be combined with each other, unless otherwise specified.

The technical solutions in the embodiments of this application may not only be applied to existing video coding standards (for example, standards such as H.264 and HEVC), but also be applied to future video coding standards (for example, the H.266 standard). Terms used in implementations of this application are merely intended to explain specific embodiments of this application, and are not intended to limit this application. The following first briefly describes some concepts that may be used in the embodiments of this application.

Video coding typically refers to processing of a sequence of pictures, where the sequence of pictures forms a video or a video sequence. In the video coding field, the terms "picture", "frame", and "image" may be used as synonyms. Video coding in this specification refers to video encoding or video decoding. Video encoding is performed on a source side, and usually includes processing (for example, through compression) an original video picture to reduce an amount of data for representing the video picture, for more efficient storage and/or transmission. Video decoding is performed on a destination side, and usually includes inverse processing relative to an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures, a picture is further partitioned into slices, and a slice is further partitioned into blocks. Video coding is performed by block. In some new video coding standards, the concept "block" is further extended. For example, a macroblock (MB) is introduced in the H.264 standard. The macroblock may further be partitioned into a plurality of prediction blocks that can be used for predictive coding (partition). In the high efficiency video coding (HEVC) standard, basic concepts such as "coding unit" (CU), "prediction unit" (PU), and "transform unit" (TU) are used. A plurality of types of block units are obtained through function division, and are described by using a new tree-based structure. For example, a CU may be partitioned into smaller CUs based on a quadtree, and the smaller CU may further be partitioned, to generate a quadtree structure. The CU is a basic unit for partitioning and encoding a coded picture. A PU and a TU also have similar tree structures. The PU may correspond to a prediction block, and is a basic unit for predictive coding. The CU is further partitioned into a plurality of PUs in a partitioning mode. The TU may correspond to a transform block, and is a basic unit for transforming a prediction residual. However, in essence, all of the CU, the PU, and the TU are conceptually blocks (or referred to as picture blocks).

For example, in HEVC, a CTU is partitioned into a plurality of CUs by using a quadtree structure represented as a coding tree. A decision on whether to encode a picture region through inter (temporal) or intra (spatial) prediction is made at a CU level. Each CU may further be partitioned into one, two, or four PUs based on a PU partitioning pattern. In one PU, a same prediction process is applied, and related information is transmitted to a decoder on a PU basis. After obtaining a residual block by applying the prediction process based on the PU partitioning pattern, the CU may be partitioned into transform units (TU) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a to-be-encoded picture block in a current coded picture may be referred to as a current block. For example, in encoding, the current block is a block that is being encoded, and in decoding, the current block is a block that is being decoded. A picture block neighboring to the current block is referred to as a neighboring block, and the neighboring block is a reconstructed (that is, encoded or decoded) picture block. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, an original video picture may be reconstructed. To be specific, a reconstructed video picture has same quality as the original video picture (assuming that no transmission loss or other data loss occurs during storage or transmission). In a case of lossy video coding, further compression is performed through, for example, quantization, to reduce an amount of data for representing a video picture, but the video picture cannot be completely reconstructed on a decoder side. To be specific, quality of a reconstructed video picture is lower or poorer than that of the original video picture.

Several H.261 video coding standards are for "lossy hybrid video coding" (to be specific, spatial and temporal prediction in a sample domain is combined with 2D transform coding for applying quantization in a transform domain). Each picture of a video sequence is usually partitioned into a set of non-overlapping blocks, and coding is usually performed at a block level. To be specific, on an encoder side, a video is usually processed, that is, encoded, at a block (video block) level. For example, a prediction block is generated through spatial (intra) prediction and temporal (inter) prediction, the prediction block is subtracted from a current block (a block being processed or to be processed) to obtain a residual block, and the residual block is transformed in the transform domain and quantized to reduce an amount of data that is to be transmitted (compressed). On a decoder side, an inverse processing part relative to an encoder is applied to an encoded block or a compressed block to reconstruct the current block for representation. Furthermore, the encoder duplicates a processing loop of a decoder, so that the encoder and the decoder generate same prediction (for example, intra prediction and inter prediction) and/or reconstruction, to process, that is, to code, subsequent blocks.

The following describes a system architecture to which the embodiments of this application are applied. FIG. 1A is a schematic block diagram of an example of a video encoding and decoding system 10 to which the embodiments of this application are applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13. The destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation form, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. Quantities of samples in horizontal and vertical directions (or axes) of the array or the picture define a size and/or resolution of the picture. For color representation, three color components are usually used. To be specific, the picture may be represented as or include three sample arrays. For example, in an RBG format or color space, the picture includes corresponding red, green, and blue sample arrays. However, in video coding, each pixel is usually represented in a luma/chroma format or color space. For example, a picture in a YUV format includes a luma component indicated by Y (sometimes indicated by L alternatively) and two chroma components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In this embodiment of this application, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of a context modeling method for a flag that is described in the embodiments of this application.

The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example, configured to encapsulate the encoded picture data 21 into an appropriate format, for example, a data packet, for transmission over the link 13.

The destination device 14 includes a decoder 30. Optionally, the destination device 14 may further include a communications interface 28, a picture post-processor 32, and a display device 34. Descriptions are separately provided as follows.

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bi-directional communications interfaces, and may be configured to, for example, send and receive messages to establish a connection, and acknowledge and exchange any other information related to a communication link and/or data transmission such as encoded picture data transmission.

The decoder 30 is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of a context modeling method for a flag that is described in the embodiments of this application.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture to, for example, a user or a viewer. The display device 34 may be or may include any type of display for presenting a reconstructed picture, for example, an integrated or external display or monitor. For example, the display may include a liquid crystal display (LCD), an organic light-emitting diode (OLED) display, a plasma display, a projector, a micro LED display, a liquid crystal on silicon (LCoS), a digital light processor (DLP), or any type of other display.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any of various suitable circuits, for example, one or more microprocessors, digital signal processors (DSP), application-specific integrated circuits (ASIC), field-programmable gate arrays (FPGA), discrete logic, hardware, or any combination thereof. If the technologies are implemented partially by using software, a device may store a software instruction in a suitable non-transitory computer-readable storage medium and may execute the instruction by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example and the techniques of this application may be applied to video coding settings (for example, video encoding or video decoding) that do not necessarily include any data communication between an encoding device and a decoding device. In another example, data may be retrieved from a local memory, streamed over a network, or the like. A video encoding device may encode the data and store the data into a memory, and/or a video decoding device may retrieve the data from the memory and decode the data. In some examples, devices that only encode data and store the data in the memory and/or retrieve the data from the memory and decode the data and that do not communicate with each other perform encoding and decoding.

Figure 1B:
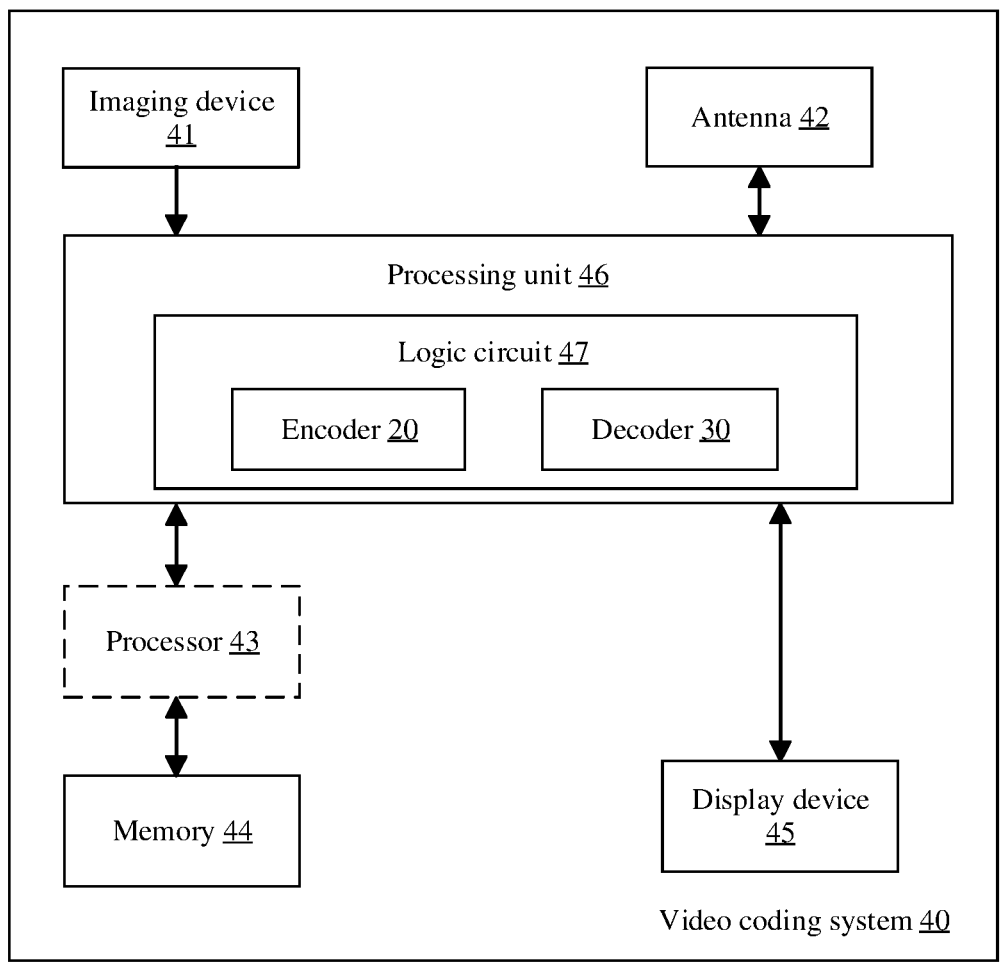
FIG. 1B is a block diagram of an example of a video coding system 40 according to an embodiment of this application.
Figure 2:
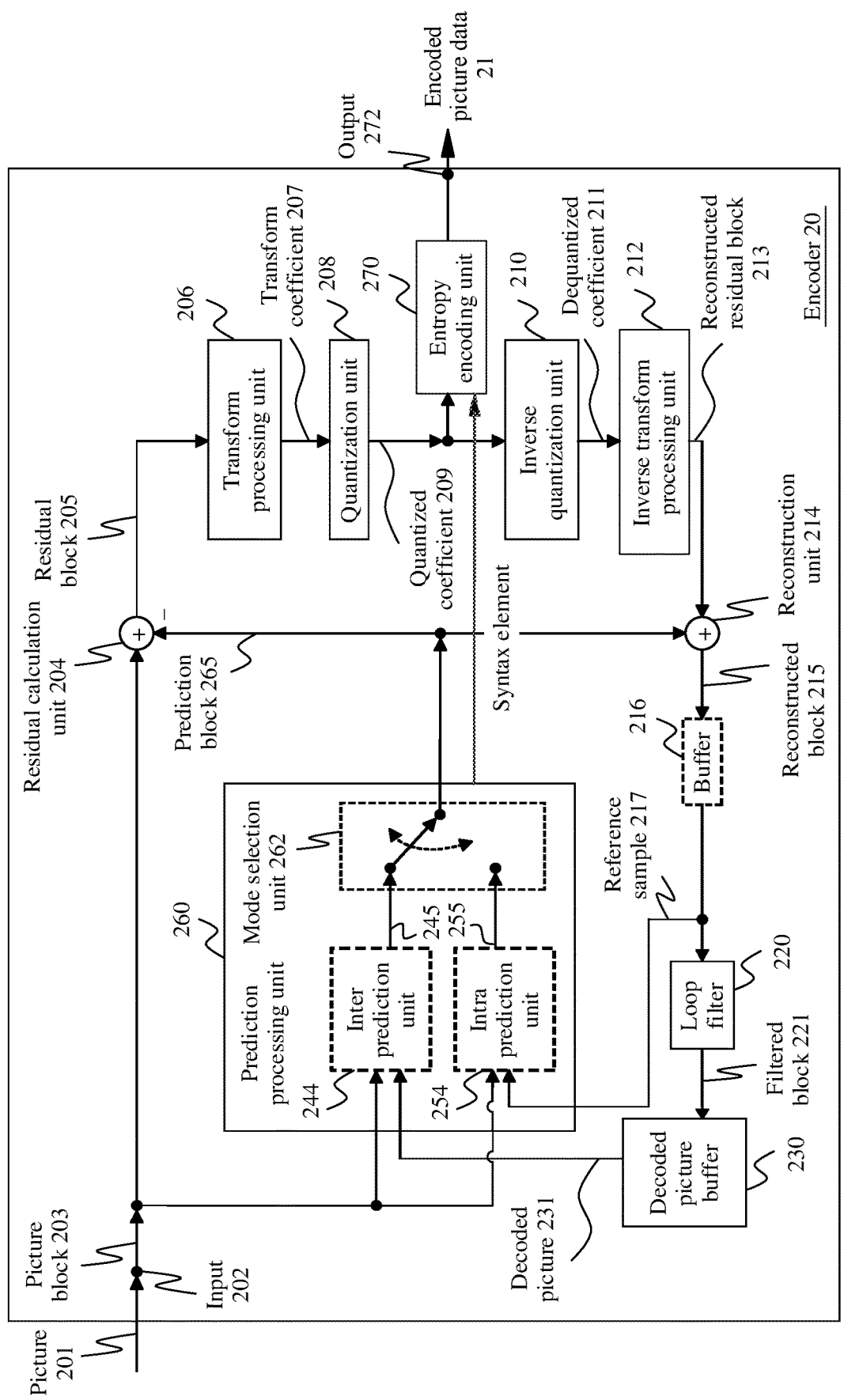
FIG. 2 is a block diagram of an example structure of an encoder 20 according to an embodiment of this application.
Figure 3:
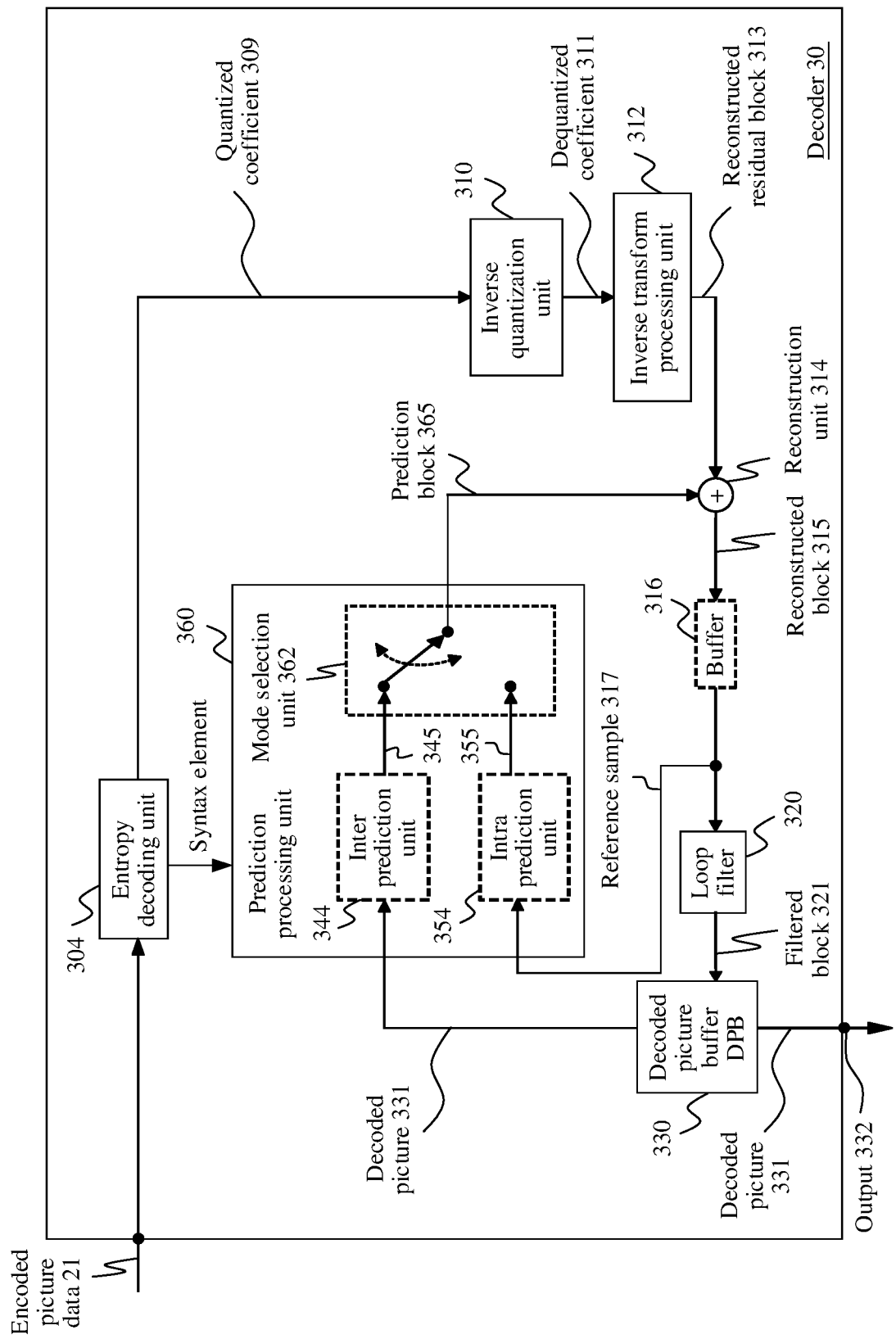
FIG. 3 is a block diagram of an example structure of a decoder 30 according to an embodiment of this application.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of this application. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include application-specific integrated circuit (ASIC) logic, a graphics processor, a general-purpose processor, or the like. The video coding system 40 may also include the optional processor 43. The optional processor 43 may similarly include application-specific integrated circuit (ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In a non-restrictive example, the memory 44 may be implemented by cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by the processing unit 46 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame encoding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy-encode the syntax element into an encoded video bitstream. In such examples, the decoder 30 may parse the syntax element and correspondingly decode the related video data.

It should be noted that, a context modeling method for a flag according to the embodiments of this application is mainly used in an entropy encoding and entropy decoding process. This process exists for both the encoder 20 and the decoder 30. The encoder 20 and the decoder 30 in the embodiments of this application may be an encoder and a decoder corresponding to video standard protocols such as H.263, H.264, HEVC, MPEG-2, MPEG-4, VP8, and VP9 or next-generation video standard protocols (such as H.266).

FIG. 2 is a schematic/conceptual block diagram of an example of an encoder 20 according to an embodiment of this application. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to a decoder 30 in FIG. 3).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

An embodiment of the encoder 20 may include a partitioning unit (not depicted in FIG. 2), configured to partition the picture 201 into a plurality of blocks such as the picture block 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above. Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (further details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints. For example, the scale factor is a power of two for a shift operation, a bit depth of the transform coefficient, and a tradeoff between accuracy and implementation costs. For example, a specific scale factor is specified for the inverse transform by, for example, the inverse transform processing unit 212 on a decoder 30 side (and for a corresponding inverse transform by, for example, the inverse transform processing unit 212 on an encoder 20 side), and correspondingly, a corresponding scale factor may be specified for the forward transform by the transform processing unit 206 on the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (quantization parameter, QP). For example, for scalar quantization, different scales may be applied to achieve finer or coarser quantization. A smaller quantization step size corresponds to finer quantization, and a larger quantization step size corresponds to coarser quantization. An appropriate quantization step size may be indicated by a quantization parameter (quantization parameter, QP). For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), and vice versa. The quantization may include division by a quantization step size and corresponding quantization or inverse quantization, for example, performed by the inverse quantization unit 210, or may include multiplication by a quantization step size. In embodiments according to some standards such as HEVC, a quantization parameter may be used to determine the quantization step size. Generally, the quantization step size may be calculated based on a quantization parameter by using a fixed point approximation of an equation including division. Additional scale factors may be introduced for quantization and dequantization to restore a norm of a residual block, where the norm of the residual block may be modified because of a scale used in the fixed point approximation of the equation for the quantization step size and the quantization parameter. In an example implementation, a scale of the inverse transform may be combined with a scale of the dequantization. Alternatively, a customized quantization table may be used and signaled from an encoder to a decoder, for example, in a bitstream. The quantization is a lossy operation, where a larger quantization step size indicates a higher loss.

The inverse quantization unit 210 is configured to apply the inverse quantization of the quantization unit 208 to a quantized coefficient to obtain a dequantized coefficient 211, for example, apply, based on or by using a same quantization step size as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient 207 due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or briefly referred to as a "buffer" 216), for example, a line buffer 216, is configured to buffer or store the reconstructed block 215 and a corresponding sample value, for example, for intra prediction. In other embodiments, the encoder may be configured to use unfiltered reconstructed blocks and/or corresponding sample values stored in the buffer unit 216 for any type of estimation and/or prediction, for example, intra prediction.

For example, in an embodiment, the encoder 20 may be configured so that the buffer unit 216 is configured to store not only the reconstructed block 215 used for the intra prediction unit 254 but also a reconstructed block (not shown in FIG. 2) used for the loop filter unit 220 and/or so that, for example, the buffer unit 216 and the decoded picture buffer 230 form one buffer. In another embodiment, a filtered block 221 and/or a block or sample (not shown in FIG. 2) from the decoded picture buffer 230 are/is used as an input or a basis for the intra prediction unit 254.

The loop filter unit 220 (or briefly referred to as a "loop filter" 220) is configured to filter the reconstructed block 215 to obtain the filtered block 221, to smooth pixel transition or improve video quality. The loop filter unit 220 is intended to represent one or more loop filters such as a deblocking filter, a sample-adaptive offset (sample-adaptive offset, SAO) filter, or another filter, for example, a bilateral filter, an adaptive loop filter (adaptive loop filter, ALF), a sharpening or smoothing filter, or a collaborative filter. Although the loop filter unit 220 is shown as an in-loop filter in FIG. 2, in another configuration, the loop filter unit 220 may be implemented as a post filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that the decoder 30 can receive and apply the same loop filter parameter for decoding.

The decoded picture buffer (DPB) 230 may be a reference picture memory that stores reference picture data for use in video data encoding by the encoder 20. The DPB 230 may include any one of a variety of memory devices such as a dynamic random access memory (DRAM) (including a synchronous DRAM (SDRAM), a magnetoresistive RAM (MRAM), or a resistive RAM (RRAM)), or other types of memory devices. The DPB 230 and the buffer 216 may be provided by a same memory device or separate memory devices. In an example, the decoded picture buffer (DPB) 230 is configured to store the filtered block 221. The decoded picture buffer 230 may further be configured to store other previously filtered blocks, for example, previously reconstructed and filtered blocks 221, of the same current picture or of different pictures, for example, previously reconstructed pictures, and may provide complete previously reconstructed, that is, decoded, pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (decoded picture buffer, DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (rate distortion optimization, RDO), that is, select a prediction mode that provides minimum rate-distortion optimization or select a prediction mode for which related rate distortion at least satisfies a prediction mode selection criterion.

The following describes in detail prediction processing (for example, performed by the prediction processing unit 260) and mode selection (for example, performed by the mode selection unit 262) performed by an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (that is, for example, at least some decoded pictures stored in the DPB 230, as described above) and other inter prediction parameters, for example, depends on whether the entire reference picture or only a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, an advanced motion vector prediction (Advanced Motion Vector Prediction, AMVP) mode and a merge (merge) mode. In specific implementation, the set of inter prediction modes may include an improved control point-based AMVP mode and an improved control point-based merge mode in the embodiments of this application. In an example, the intra prediction unit 254 may be configured to perform any combination of inter prediction technologies described below.

In addition to the foregoing prediction modes, a skip mode and/or a direct mode may also be applied in the embodiments of this application.

The prediction processing unit 260 may be further configured to partition the picture block 203 into smaller block partitions or subblocks, for example, by iteratively using quadtree (QT) partitioning, binary tree (BT) partitioning, ternary tree (TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 231, or in other words, the current picture and the previously decoded pictures 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a position (coordinates X and Y) of the reference block and a position of the current block as an inter prediction parameter. The offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate an additional pixel sample from a known pixel sample, thereby potentially increasing a quantity of candidate prediction blocks that may be used to encode a picture block. Upon receiving a motion vector for a PU of the current picture block, a motion compensation unit 246 may locate a prediction block to which the motion vector points in a reference picture list. The motion compensation unit 246 may further generate syntax elements associated with a block and a video slice, for decoding a picture block of the video slice by the decoder 30.

Specifically, the inter prediction unit 244 may transmit the syntax elements to the entropy encoding unit 270, and the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, for the entropy encoding unit 270. In an example, the intra prediction unit 254 may be configured to perform any combination of intra prediction technologies.

Specifically, the intra prediction unit 254 may transmit syntax elements to the entropy encoding unit 270, and the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or not apply) an entropy encoding algorithm or scheme (for example, a variable-length coding (variable length coding, VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding methodology or technology) to one or all of the quantized residual coefficient 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 30, or archived for later transmission or retrieval by the video decoder 30. The entropy encoding unit 270 may further be configured to entropy-encode another syntax element for a current video slice being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 combined into a single unit.

Specifically, in the embodiments of this application, the encoder 20 may be configured to implement a context modeling method for a flag that is described in the following embodiments.

It should be understood that another structural variant of the video encoder 20 may be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional. In addition, in a case of lossless compression encoding, the transform processing unit 206, the quantization unit 208, the inverse quantization unit 210, and the inverse transform processing unit 212 are optional. It should be understood that in different application scenarios, the inter prediction unit 244 and intra prediction unit 254 may be used selectively.

FIG. 3 is a schematic/conceptual block diagram of an example of a decoder 30 configured to implement an embodiment of this application. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with respect to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 210. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block of the current video slice based on a signaled intra prediction mode and data of a previously decoded block of a current frame or picture. When the video frame is encoded into an inter-encoded (namely, B or P) slice, the inter prediction unit 344 (for example, a motion compensation unit) of the prediction processing unit 360 is configured to generate the prediction block 365 for a video block of the current video slice based on a motion vector and the another syntax element that is received from the entropy decoding unit 304. For inter prediction, the prediction block may be generated from one of reference pictures in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate the prediction block for the current video block being decoded. In an example of this application, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of the reference picture lists for the slice, a motion vector of each inter encoded video block for the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice to determine a quantization degree that should be applied and an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (in a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters such as a deblocking filter, a sample-adaptive offset (sample-adaptive offset, SAO) filter, or another filter, for example, a bilateral filter, an adaptive loop filter (adaptive loop filter, ALF), a sharpening or smoothing filter, or a collaborative filter. Although the loop filter unit 320 is shown as an in-loop filter in FIG. 3, in another configuration, the loop filter unit 320 may be implemented as a post filter. Then, a decoded video block 321 in a given frame or picture is stored in the decoded picture buffer 330 that stores a reference picture used for subsequent motion compensation.

The decoder 30 is configured to, for example, output the decoded picture 331 via an output 332, for presentation or viewing to a user.

Another variant of the video decoder 30 may be used to decode a compressed bitstream. For example, the decoder 30 may generate an output video stream without the loop filter unit 320. For example, a non-transform based decoder 30 can inverse-quantize a residual signal directly without the inverse transform processing unit 312 for some blocks or frames. In another implementation, the video decoder 30 may have the inverse quantization unit 310 and the inverse transform processing unit 312 combined into a single unit.

Specifically, in the embodiments of this application, the decoder 30 is configured to implement a context modeling method for a flag that is described in the following embodiments.

It should be understood that another structural variant of the video decoder 30 can be used to decode the encoded video bitstream. For example, the video decoder 30 may generate an output video stream without processing by the filter 320. Alternatively, for some picture blocks or picture frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that in different application scenarios, the inter prediction unit and the intra prediction unit may be used selectively.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of the current picture block or a motion vector of a subblock of the current picture block derived from a motion vector of a neighboring affine coding block may be further processed. This is not limited in this application. For example, a value of the motion vector is constrained to be within a specific bit depth range. Assuming that an allowed bit depth of the motion vector is bitDepth, the value of the motion vector ranges from $-2^{(bitDepth-1)}$ to $2^{(bitDepth-1)}-1$, where the symbol "^" represents exponentiation. If bitDepth is 16, the value ranges from −32768 to 32767. If bitDepth is 18, the value ranges from −131072 to 131071. For another example, the value of the motion vector (for example, motion vectors MVs of four 4×4 subblocks within one 8×8 picture block) is constrained so that a maximum difference between integer parts of the MVs of the four 4×4 subblocks does not exceed N pixels, for example, not exceed 1 pixel.

The following two manners may be used to constrain the value of the motion vector to be within the specific bit depth range:

Manner 1: Remove an overflow most significant bit of the motion vector:

$$ux = (vx + 2^{bitDepth}) \% 2^{bitDepth}$$

$$vx = (ux > = 2^{bitDepth-1}) ? (ux - 2^{bitDepth}) : ux$$

$$uy = (vy + 2^{bitDepth}) \% 2^{bitDepth}$$

$$vy = (uy > = 2bitDepth - 1) ? (uy - 2bitDepth) : uy$$

Herein, vx represents a horizontal component of the motion vector of the picture block or the subblock of the picture block, vy represents a vertical component of the motion vector of the picture block or the subblock of the picture block, ux and uy are intermediate values, and bit-Depth represents a bit depth.

For example, a value of vx is −32769, and 32767 is derived according to the foregoing formulas. A value is stored in a computer in a form of a two's complement, a two's complement of −32769 is 1,0111,1111,1111,1111 (17 bits), and processing performed by the computer for overflowing is discarding a most significant bit. Therefore, the value of vx is 0111,1111,1111,1111, that is, 32767. This value is consistent with the result derived through processing according to the formulas.

Manner 2: Perform clipping on the motion vector according to the following formulas:

$$vx = \text{Clip3}(-2bitDepth-1, 2bitDepth-1-1, vx)$$

$$vy = \text{Clip3}(-2bitDepth-1, 2bitDepth-1-1, vy)$$

Herein, vx represents a horizontal component of the motion vector of the picture block or the subblock of the picture block, vy represents a vertical component of the motion vector of the picture block or the subblock of the picture block, x, y, and z are respectively corresponding to three input values in an MV clipping process Clip3, and a definition of Clip3 is clipping a value of z into a range [x, y].

$$\text{Clip3}(x, y, z) = \begin{cases} x; & z < x \\ y; & z > y \\ z; & \text{otherwise} \end{cases}$$

Figure 4:
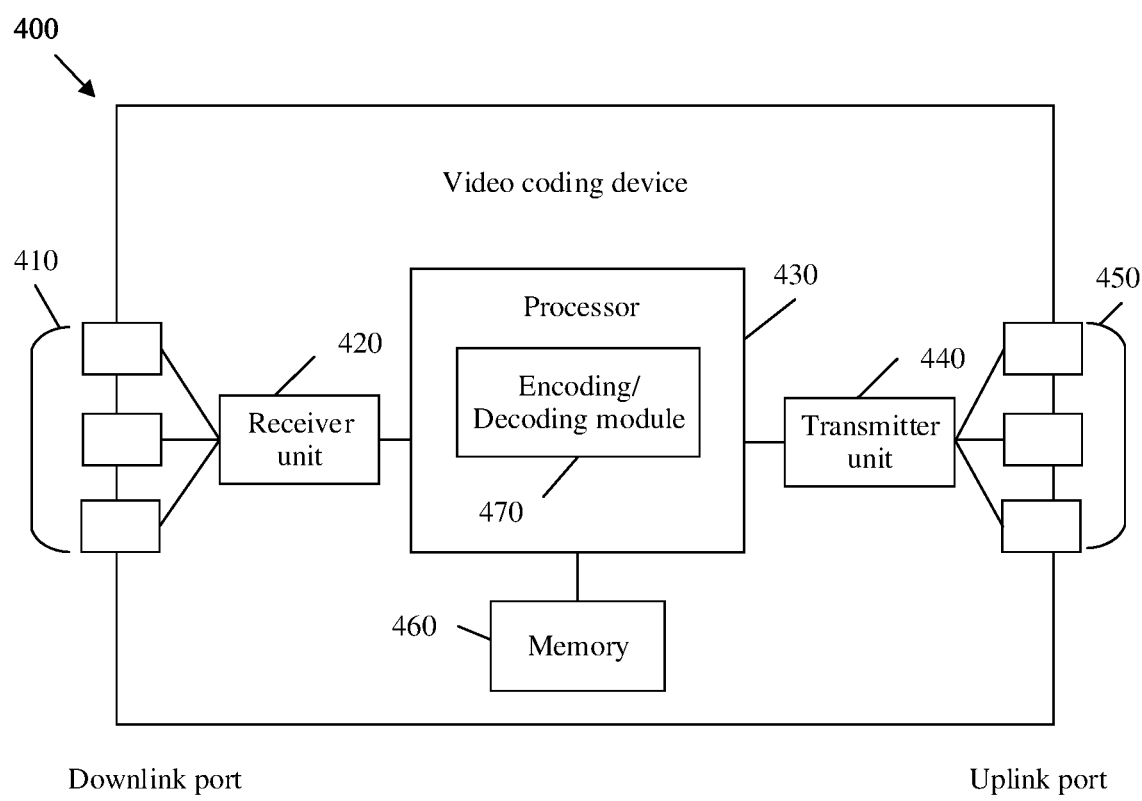
FIG. 4 is a block diagram of an example of a video coding device 400 according to an embodiment of this application.

FIG. 4 is a schematic structural diagram of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: an ingress port 410 and a receiver unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the context modeling method for a flag provided in the embodiments of this application. For example, the encoding/decoding module 470 performs, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (ternary content-addressable memory, TCAM), and/or a static random access memory (SRAM).

Figure 5:
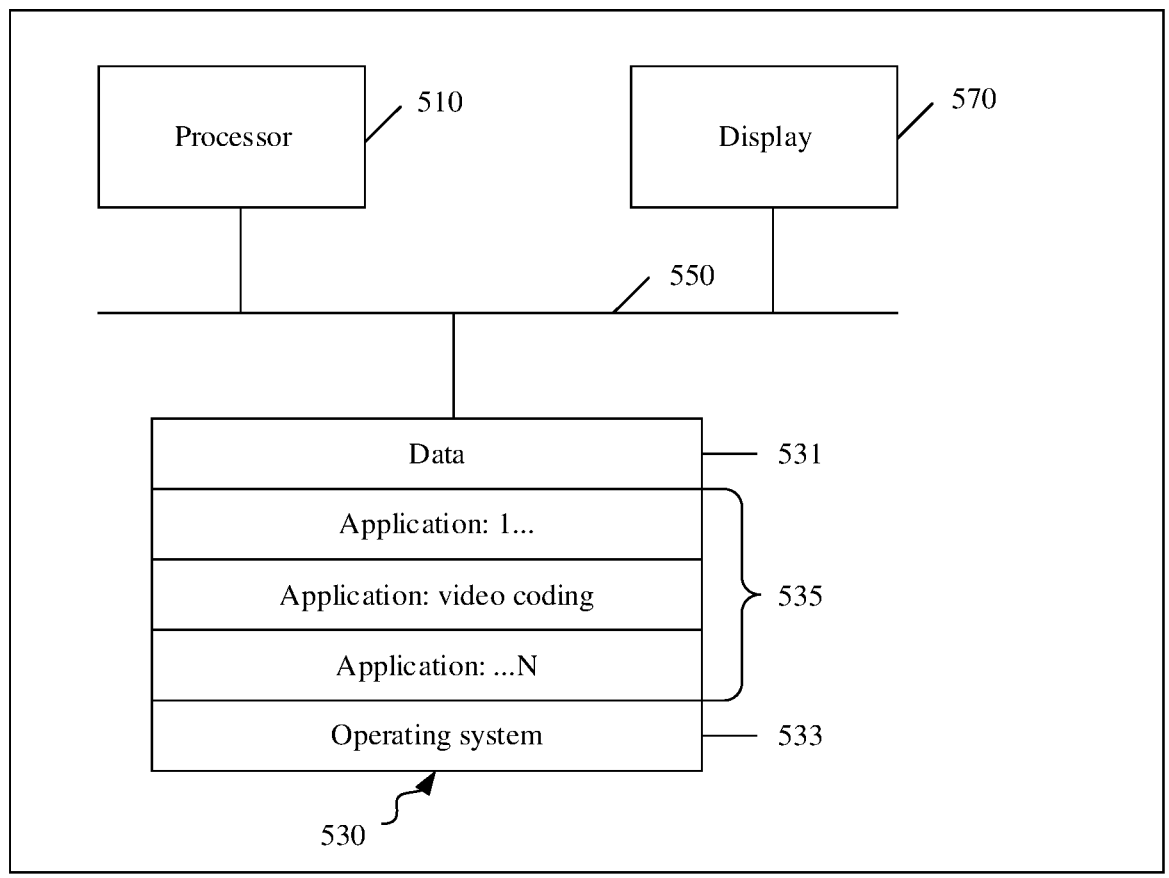
FIG. 5 is a block diagram of another example of an encoding apparatus or a decoding apparatus according to an embodiment of this application.

FIG. 5 is a simplified block diagram of an apparatus that may be used as either or two of the source device 12 and the destination device 14 in FIG. 1A according to an example embodiment. The apparatus can implement the technologies in this application. In other words, FIG. 5 is a schematic block diagram of an implementation of an encoding device or a decoding device (coding device 500 for short) according to an embodiment of this application. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code. The processor may invoke the program code stored in the memory, to perform various video encoding or decoding methods described in this application, particularly various new context modeling methods for a flag. To avoid repetition, details are not described herein.

In this embodiment of this application, the processor 510 may be a central processing unit (CPU), or the processor 510 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, any conventional processor, or the like.

The memory 530 may include a read-only memory (ROM) device or a random access memory (RAM) device. Any other storage device of an appropriate type may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method described in this application (particularly the context modeling method for a flag that is described in this application). For example, the application program 535 may include applications 1 to N, and further include a video encoding or decoding application (referred to as a video coding application for short) that performs the video encoding or decoding method described in this application.

In addition to a data bus, the bus system 550 may further include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

The following describes the solutions in the embodiments of this application in detail. A context modeling method for a flag that is provided in the embodiments of this application may be applied to a decoder side or may be applied to an encoder side. Specifically, on the encoder side, after completing prediction for a current block, the encoder side entropy-encodes some flags, and transmits an encoded bitstream to the decoder side. On the decoder side, the decoder side first parses the bitstream, entropy-decodes the bitstream to obtain a flag, and then completes prediction for the current block based on the flag.

Figure 6:
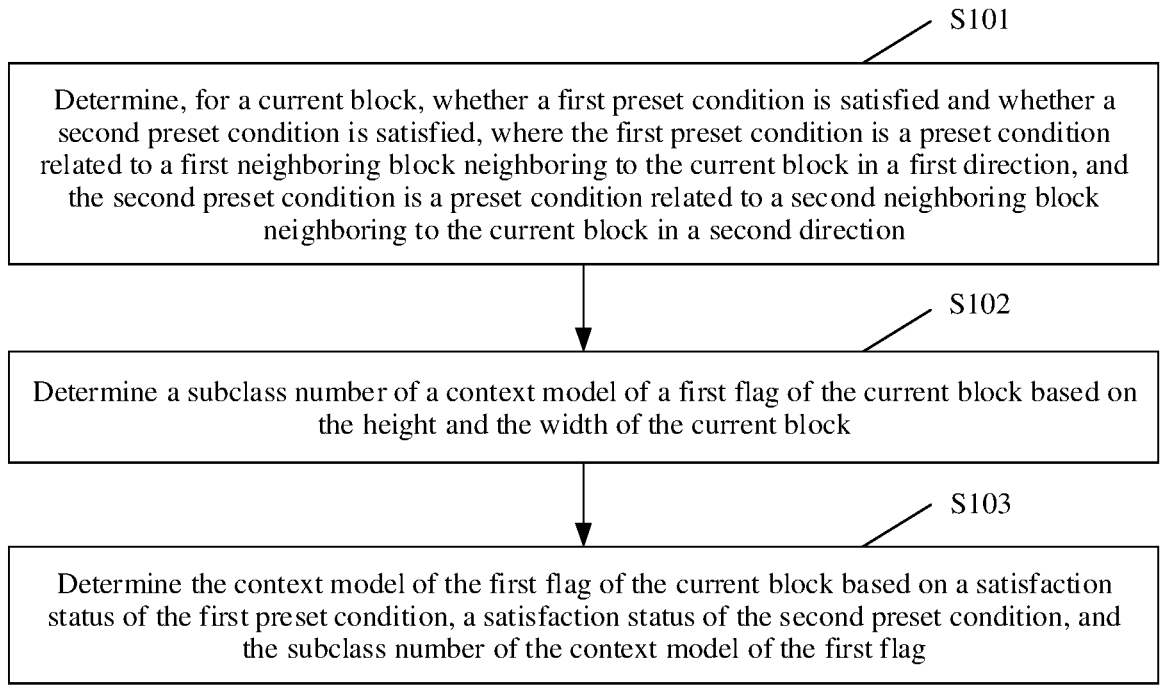
FIG. 6 is a schematic flowchart 1 of a context modeling method for a flag according to an embodiment of this application.

FIG. 6 is a schematic method diagram. A context modeling method for a flag according to an embodiment of this application may include S101 to S103.

S101: Determine, for a current block, whether a first preset condition is satisfied and whether a second preset condition is satisfied, where the first preset condition is a preset condition related to a first neighboring block neighboring to the current block in a first direction, and the second preset condition is a preset condition related to a second neighboring block neighboring to the current block in a second direction.

The first direction is perpendicular to the second direction.

Optionally, the first direction may be a horizontal leftward direction, and the second direction may be a vertical upward direction. Certainly, in some embodiments, the first direction may alternatively be a horizontal rightward direction, and the second direction may alternatively be a vertical downward direction. Specifically, the first direction and the second direction may be determined according to an actual coding rule. This is not limited in this embodiment of this application.

In this embodiment of this application, the context modeling method for a flag is described mainly by using an example in which the first direction is the horizontal leftward direction and the second direction is the vertical upward direction. When the first direction is the horizontal leftward direction, the first neighboring block is a neighboring block on the left of the current block. When the second direction is the vertical upward direction, the second neighboring block is a neighboring block above the current block. The first neighboring block and the second neighboring block are spatially neighboring blocks of the current block. It should be noted that the first neighboring block covers a preset position relative to the current block in the first direction, and the second neighboring block covers a preset position relative to the current block in the second direction.

Figure 7:
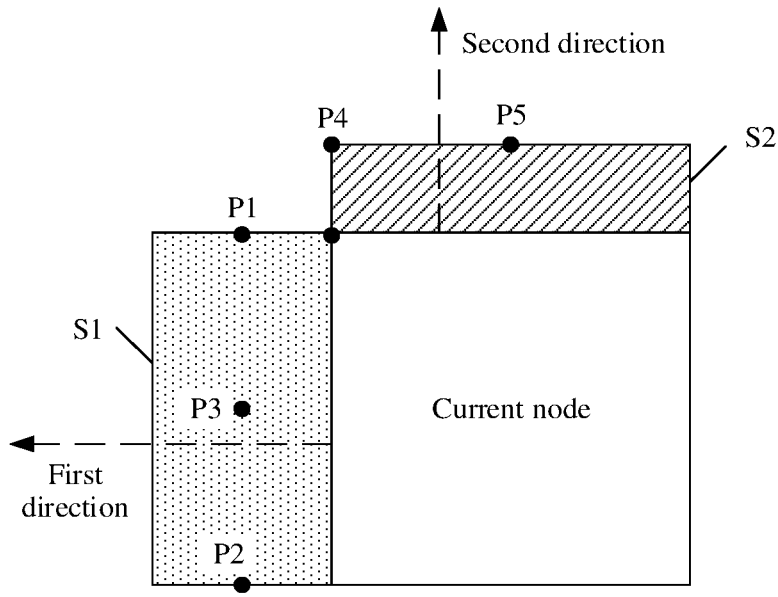
FIG. 7 is a schematic diagram of determining a neighboring block according to an embodiment of this application.

Referring to FIG. 7, a method for determining the first neighboring block may be: determining, as the first neighboring block, any neighboring block in at least one neighboring block that is on the left of the current block and that covers a preset position on the left of the current block, where the preset position may be any position in a region S1 that is on the left of the current block and that is at a preset distance from the current block. For example, the preset distance may be 4 or another value such as 8. For example, if the width of the current block is M (the width of the current block refers to a size of the current block in the first direction), the height of the current block is N (the height of the current block refers to a size of the current block in the second direction), the preset distance is 1, and coordinates corresponding to a top-left pixel of the current block are (x, y), the preset position may be a position P1 with coordinates (x−1, y) in S1, may be a position P2 with coordinates (x−1, y+N−1), or may be a position P3 with coordinates (x−1, y+N/2). The preset position may alternatively be another position in S1, and is specifically selected based on an actual situation. This is not limited in this embodiment of this application.

Likewise, referring to FIG. 7, a method for determining the second neighboring block may be: determining, as the second neighboring block, any neighboring block in at least one neighboring block that is above the current block and that covers a preset position above the current block, where the preset position may be any position in a region S2 that is above the current block and that is at a preset distance from the current block. For example, if the width of the current block is M, the height of the current block is N, the preset distance is 1, and coordinates corresponding to a top-left pixel of the current block are (x, y), the preset position may be a position P4 with coordinates (x, y−1) in S2, or may be a position P5 with coordinates (x+M/2, y−1). The preset position may alternatively be another position in S2, and is specifically selected based on an actual situation. This is not limited in this embodiment of this application.

In this embodiment of this application, the first preset condition is the preset condition related to the first neighboring block. Specifically, the first preset condition means that the first neighboring block of the current block is available and a first flag of the first neighboring block is 1. Whether the first preset condition is satisfied includes: The first preset condition is satisfied when the first neighboring block of the current block is available and the first flag of the first neighboring block is 1, or the first preset condition is not satisfied when the first neighboring block of the current block is not available or the first flag of the first neighboring block is not 1. The second preset condition is the preset condition related to the second neighboring block. Specifically, the second preset condition means that the second neighboring block of the current block is available and a first flag of the second neighboring block is 1. Whether the second preset condition is satisfied includes: The second preset condition is satisfied when the second neighboring block of the current block is available and the first flag of the second neighboring block is 1, or the second preset condition is not satisfied when the second neighboring block of the current block is not available or the first flag of the second neighboring block is not 1.

It should be noted that, in this embodiment of this application, that the first neighboring block is available means that the first neighboring block is located in a picture (or referred to as a video frame) region to which the current block belongs and the first neighboring block has been reconstructed (that is, encoded or decoded). If the first neighboring block is not located in a picture region to which the current block belongs or the first neighboring block has not been reconstructed, the first neighboring block is not available. Likewise, that the second neighboring block is available means that the second neighboring block is located in the picture region to which the current block belongs and the second neighboring block has been reconstructed. If the second neighboring block is not located in the picture region to which the current block belongs or the second neighboring block has not been reconstructed, the second neighboring block is not available.

It should be understood that there may be another condition for determining whether a neighboring block is available. For example, if the neighboring block and the current block are in a same slice, the neighboring block is available. If the neighboring block and the current block are not in a same slice, the neighboring block is not available.

Optionally, in this embodiment of this application, there are a plurality of methods for determining whether a picture block has been reconstructed. For example, in H.265, z-order indices (z-order index) of the current block and the neighboring block may be compared to determine whether the neighboring block has been reconstructed. Alternatively, a mask (mask) indicating whether each region of a picture is reconstructed may be generated. After a picture block is reconstructed, a corresponding region on the mask is marked as reconstructed. Whether the neighboring block has been reconstructed is determined by querying a mask value corresponding to the neighboring block.

The flag (that is, the first flag) in this embodiment of this application may include one of the following flags: a skip mode flag (for example, denoted as cu_skip_flag), a prediction mode flag (for example, denoted as pred_mode_flag), a merge mode flag (for example, denoted as merge_flag), an affine merge mode flag (for example, denoted as merge_affine_flag), an affine advanced motion vector prediction (for example, affine AMVP) mode flag (for example, denoted as inter_affine_flag), and an adaptive motion vector resolution (AMVR) mode flag (for example, denoted as amvr_flag). The first flag may alternatively be a flag other than the foregoing flags. This is not limited in this embodiment of this application.

For example, Table 1 is an example of a syntax element in standard text or code in the video coding field.

TABLE 1

| coding_unit(x0,y0,cbWidth,cbHeight,treeType) { | Descriptor |
|---|---|
| if( slice_type != I ) { | |
|   cu_skip_flag[x0][y0] | ae(v) |
|   if( cu_skip_flag[x0][y0] == 0 ) | |
|     pred_mode_flag | ae(v) |
| } | |
| if( CuPredMode[x0][y0] == MODE_INTRA ){ | |
| ... | |
| } else { /* MODE_INTER */ | |
|   if( cu_skip_flag[x0][y0] ) { | |
|     ... | |
|     merge_affine_flag[x0][y0] | ae(v) |
|     if( merge_affine_flag[x0][y0] == 0 && MaxNumMergeCand > 1 ) | |
|       merge_idx[x0][y0] | ae(v) |
|   } else { | |
|     merge_flag[x0][y0] | ae(v) |
|     if( merge_flag[x0][y0] ) { | |
|       ... | |
|     } else { | |
|       if( slice_type == B ) | |
|         inter_pred_idc[x0][y0] | ae(v) |
|       if( sps_affine_enabled_flag && cbWidth >= 16 && cbHeight >= 16 ) { | |
|         inter_affine_flag[x0][y0] | ae(v) |
|         ... | |
|         amvr_mode[x0][y0] | ae(v) |
|       } | |
|   } | |
| } | |
| if( CuPredMode[x0][y0] != MODE_INTRA && cu_skip_flag[x0][y0] == 0 ) | |
|   cu_cbf | ae(v) |
| if( cu_cbf ) | |
|   transform_tree(x0,y0,cbWidth,cbHeight,treeType) | |
| } | |

With reference to related descriptions in the foregoing embodiment, using cu_skip_flag as an example, in the standard text or code, cu_skip_flag[x0][y0] refers to cu_skip_flag of the current block, and (x0, y0) represents coordinates of the current block in a video frame. The coordinates are usually the coordinates of the top-left pixel of the current block. cu_skip_flag[xNbL][yNbL] refers to cu_skip_flag of the first neighboring block, and (xNbL, [yNbL) represents coordinates of the first neighboring block in the video frame. cu_skip_flag[xNbA][yNbA] refers to cu_skip_flag of the second neighboring block, and (xNbA, [yNbA) represents coordinates of the second neighboring block in the video frame. Other flags are not listed one by one herein.

In this embodiment of this application, different first flags indicate different meanings. For example, cu_skip_flag[x0][y0] is used to indicate whether a skip mode is used for the current block. cu_skip_flag[x0][y0]==1 indicates that the skip mode is used for the current block, and cu_skip_flag[x0][y0]==0 indicates that the skip mode is not used for the current block. For example, Table 2 shows meanings of several flags of the current block.

TABLE 2

| Flag | Meaning | Value of the flag | Meaning of the value of the flag |
|---|---|---|---|
| cu_skip_flag[x0][y0] | Whether a skip mode is used | cu_skip_flag[x0][y0]==1 | The skip mode is used |
| | | cu_skip_flag[x0][y0]==0 | The skip mode is not used |
| pred_mode_flag[x0][y0] | Whether an intra prediction mode is used | pred_mode_flag [x0][y0]==1 | The intra prediction mode is used |
| | | pred_mode_flag [x0][y0]==0 | The intra prediction mode is not used |
| merge_flag[x0][y0] | Whether a merge mode is used | merge_flag[x0][y0]==1 | The merge mode is used |
| | | merge_flag[x0][y0]==0 | The merge mode is not used |
| merge_affine_flag[x0][y0] | Whether an affine merge mode is used | merge_affine_flag[x0][y0]==1 | The affine merge mode is used |
| | | merge_affine_flag[x0][y0]==0 | The affine merge mode is not used |
| inter_affine_flag[x0][y0] | Whether an affine AMVP mode is used | inter_affine_flag[x0][y0]==1 | The affine AMVP mode is used |
| | | inter_affine_flag[x0][y0]==0 | The affine AMVP mode is not used |
| amvr_flag[x0][y0] | Whether an AMVR mode is used | amvr_flag[x0][y0]==1 | The AMVR mode is used |
| | | amvr_flag[x0][y0]==0 | The AMVR mode is not used |

It should be understood that names of the flags in the modes in Table 2 are merely examples, and other names may be alternatively used in the standard text or code. For example, for the flag about whether the skip mode is used for the current block, a name of the flag may be cu_skip_flag[x0][y0]. Alternatively, cu_skip_flag[x0][y0] may not be used as the name of the flag, but another name is used.

With reference to Table 1, using cu_skip_flag[x0][y0] as an example, Table 3 shows some syntax structures in the standard text or code.

TABLE 3

| Syntax element | condL | condA |
|---|---|---|
| cu_skip_flag[x0][y0] | cu_skip_flag[xNbL][yNbL]&&available | cu_skip_flag[xNbA][yNbA]&&available |

In Table 3, condL represents the first preset condition in the foregoing embodiment, a syntax structure of the first preset condition is "cu_skip_flag[xNbL][y0][yNbL]&&available", condA represents the second preset condition in the foregoing embodiment, and a syntax structure of the second preset condition is "cu_skip_flag[xNbA][y0][yNbA]&&available".

S102: Determine a subclass index of a context model of a first flag of the current block based on the height and the width of the current block.

In the context modeling field of a flag, in a joint exploration model (JEM), the flag corresponds to a plurality of optional context models whose indices (ctxInc) are 0, 1, 2 . . . . In an actual encoding or decoding process, one of the models is selected as an actually used model based on context information of the current block (for example, information about the first neighboring block and the second neighboring block).

It should be noted that, in this embodiment of this application, the subclass index is merely a name used for model index differentiation, and has no special meaning.

Figure 8:
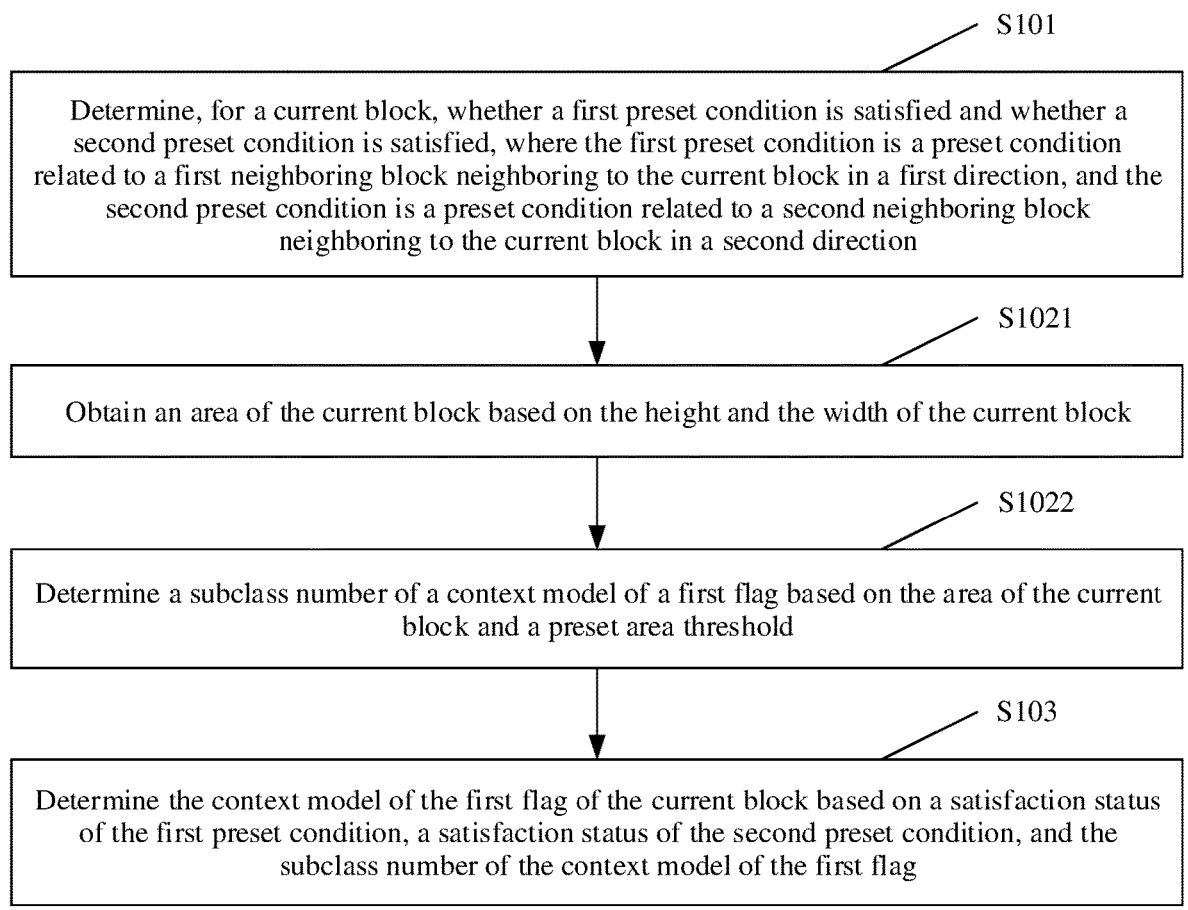
FIG. 8 is a schematic flowchart 2 of a context modeling method for a flag according to an embodiment of this application.

With reference to FIG. 6, as shown in FIG. 8, in this embodiment of this application, S102 may be specifically implemented by using S1021 and S1022.

S1021: Obtain an area of the current block based on the height and the width of the current block.

The area of the current block is a product of the height and the width of the current block.

S1022: Determine the subclass index of the context model of the first flag based on the area of the current block and a preset area threshold.

In this embodiment of this application, the preset area threshold includes two cases.

In a first case, the preset area threshold includes a first threshold and a second threshold, and the second threshold is greater than the first threshold. It may be considered that there is a mapping relationship between the preset area threshold and the subclass index. For example, the area of the current block is denoted as SizeC, the first threshold is denoted as th1, and the second threshold is denoted as th2. Table 4 is an example of the mapping relationship.

TABLE 4

| Satisfied condition | Subclass model index (ctxSetIdx) |
|---|---|
| SizeC > th2 | 0 |
| th1 ≤ SizeC ≤ th2 | 1 |
| SizeC < th1 | 2 |

In this case, the determining the subclass index of the context model of the first flag based on the area of the current block and a preset area threshold may specifically include: when the area of the current block is greater than the second threshold, determining that the subclass index of the context model of the first flag is 0; or when the area of the current block is greater than or equal to the first threshold and less than or equal to the second threshold, determining that the subclass index of the context model of the first flag is 1; or when the area of the current block is less than the first threshold, determining that the subclass index of the context model of the first flag is 2.

Optionally, in S1022, the first threshold may be 128, 256, or 64, and the second threshold may be 1024, 2048, or 512. Certainly, the first threshold and the second threshold may alternatively be other values. This is not limited in this embodiment of this application.

In a second case, the preset area threshold includes a third threshold. It may be considered that there is a mapping relationship between the preset area threshold and the subclass index. For example, the area of the current block is denoted as SizeC, the third threshold is denoted as th3. Table 5 is an example of the mapping relationship.

TABLE 5

| Satisfied condition | Subclass model index |
|---|---|
| SizeC > th3 | 0 |
| SizeC ≤ th3 | 1 |

In this case, the determining the subclass index of the context model of the first flag based on the area of the current block and a preset area threshold may specifically include: when the area of the current block is greater than the third threshold, determining that the subclass index of the context model of the first flag is 0; or when the area of the current block is less than or equal to the third threshold, determining that the subclass index of the context model of the first flag is 1.

Optionally, in S1022, the third threshold may be 1024, 2048, or 512. Certainly, the third threshold may alternatively be another value. This is not limited in this embodiment of this application.

S103: Determine the context model of the first flag of the current block based on a satisfaction status of the first preset condition, a satisfaction status of the second preset condition, and the subclass index of the context model of the first flag.

In this embodiment of this application, there are N context models of the first flag, indices of the N context models are sequentially 0 to N−1, and N is an integer greater than 1.

Specifically, S103 may be implemented by using S1031.

S1031: Determine an index of the context model of the first flag of the current block based on the satisfaction status of the first preset condition, the satisfaction status of the second preset condition, and the subclass index of the context model of the first flag, where the index of the context model of the first flag satisfies:

$$ctxInc = n\_conL + n\_conA + X * a.$$

Herein, ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, X represents the subclass index of the context model of the first flag, a is a positive integer, and * represents multiplication.

In this embodiment of this application, a is a coefficient that is a positive integer, and a value of a may be 3. Certainly, a may alternatively have another value. This is not limited in this embodiment of this application. For example, the first flag is cu_skip_flag[x0][y0]. Table 6 and Table 7 show some syntax structures for determining an index of a context model of cu_skip_flag[x0][y0].

TABLE 6

| Syntax element | condL | condA | ctxSetIdx | ctxInc |
|---|---|---|---|---|
| cu_skip_flag [x0][y0] | cu_skip_flag[xNbL] [yNbL]&&available | cu_skip_flag [xNbA][yNbA]& &available | (SizeC > sizeTh2)?0: ((SizeC>sizeTh1)? 1:2) | condA + condL + ctxSetIdx * 3 |

TABLE 7

| Syntax element | condL | condA | ctxSetIdx | ctxInc |
|---|---|---|---|---|
| cu_skip_flag[x0][y0] | cu_skip_flag[xNbL][yNbL]&& available | cu_skip_flag[xNbA][yNbA]&& available | ( SizeC > SizeTh3 ) ? 0 : 1 | condA + condL + ctxSetIdx * 3 |

In the context modeling method for a flag according to this embodiment of this application, whether the first preset condition is satisfied and whether the second preset condition is satisfied are determined for the current block, the subclass index of the context model of the first flag of the current block is determined based on the height and the width of the current block, and then the context model of the first flag of the current block is determined based on the satisfaction status of the first preset condition, the satisfaction status of the second preset condition, and the subclass index of the context model of the first flag. In addition to the context information of the current block (for example, the first flag of the first neighboring block and the first flag of the second neighboring block), information about the current block is further used (for example, the subclass index is determined based on the width and the height of the current block) to determine the context model of the first flag of the current block. In this way, accuracy of determining the context model of the flag can be improved to some extent, so that coding performance is improved.

Figure 9:
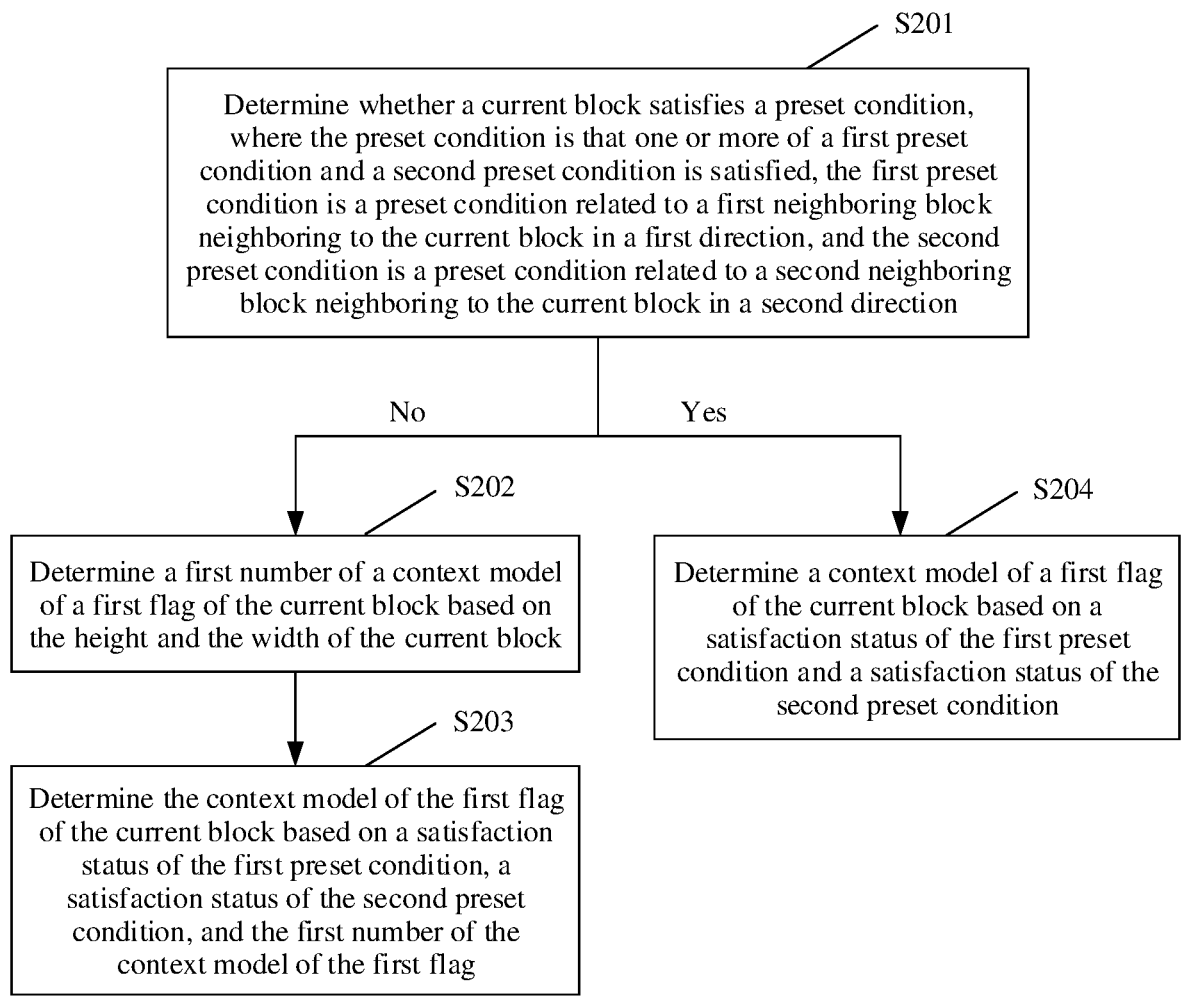
FIG. 9 is a schematic flowchart 3 of a context modeling method for a flag according to an embodiment of this application.

FIG. 9 is a schematic method diagram. A context modeling method for a flag according to an embodiment of this application may include S201 to S204.

S201: Determine whether a current block satisfies a preset condition, where the preset condition is that at least one of a first preset condition and a second preset condition is satisfied, the first preset condition is a preset condition related to a first neighboring block neighboring to the current block in a first direction, and the second preset condition is a preset condition related to a second neighboring block neighboring to the current block in a second direction.

The first direction is perpendicular to the second direction.

Optionally, the first direction may be a horizontal leftward direction, and the second direction may be a vertical upward direction.

It should be noted that, in this embodiment of this application, for related descriptions of the first direction and the second direction, descriptions of the first neighboring block and the second neighboring block, and descriptions of methods for determining the first neighboring block and the second neighboring block, refer to the specific descriptions in S101. Details are not described herein again.

Similar to that in S101, the first preset condition is the preset condition related to the first neighboring block. Specifically, the first preset condition means that the first neighboring block of the current block is available and a first flag of the first neighboring block is 1. Whether the first preset condition is satisfied includes: The first preset condition is satisfied when the first neighboring block of the current block is available and the first flag of the first neighboring block is 1, or the first preset condition is not satisfied when the first neighboring block of the current block is not available or the first flag of the first neighboring block is not 1. The second preset condition is the preset condition related to the second neighboring block. Specifically, the second preset condition means that the second neighboring block of the current block is available and a first flag of the second neighboring block is 1. Whether the second preset condition is satisfied includes: The second preset condition is satisfied when the second neighboring block of the current block is available and the first flag of the second neighboring block is 1, or the second preset condition is not satisfied when the second neighboring block of the current block is not available or the first flag of the second neighboring block is not 1.

In this embodiment of this application, the preset condition is that the at least one of the first preset condition and the second preset condition is satisfied. It may be understood that when one or both of the first preset condition and the second preset condition is/are satisfied, the current block satisfies the preset condition. Otherwise (that is, when neither the first preset condition nor the second preset condition is satisfied), the current block does not satisfy the preset condition.

When the current block does not satisfy the preset condition, S202 and S203 are performed.

S202: Determine a first index of a context model of a first flag of the current block based on the height and the width of the current block.

It should be noted that, in this embodiment of this application, the first index is merely a name used for model index differentiation, and has no special meaning.

For a related description of the first flag in this embodiment of this application, specifically refer to the detailed description of the first flag in S102. Details are not described herein again.

Figure 10:
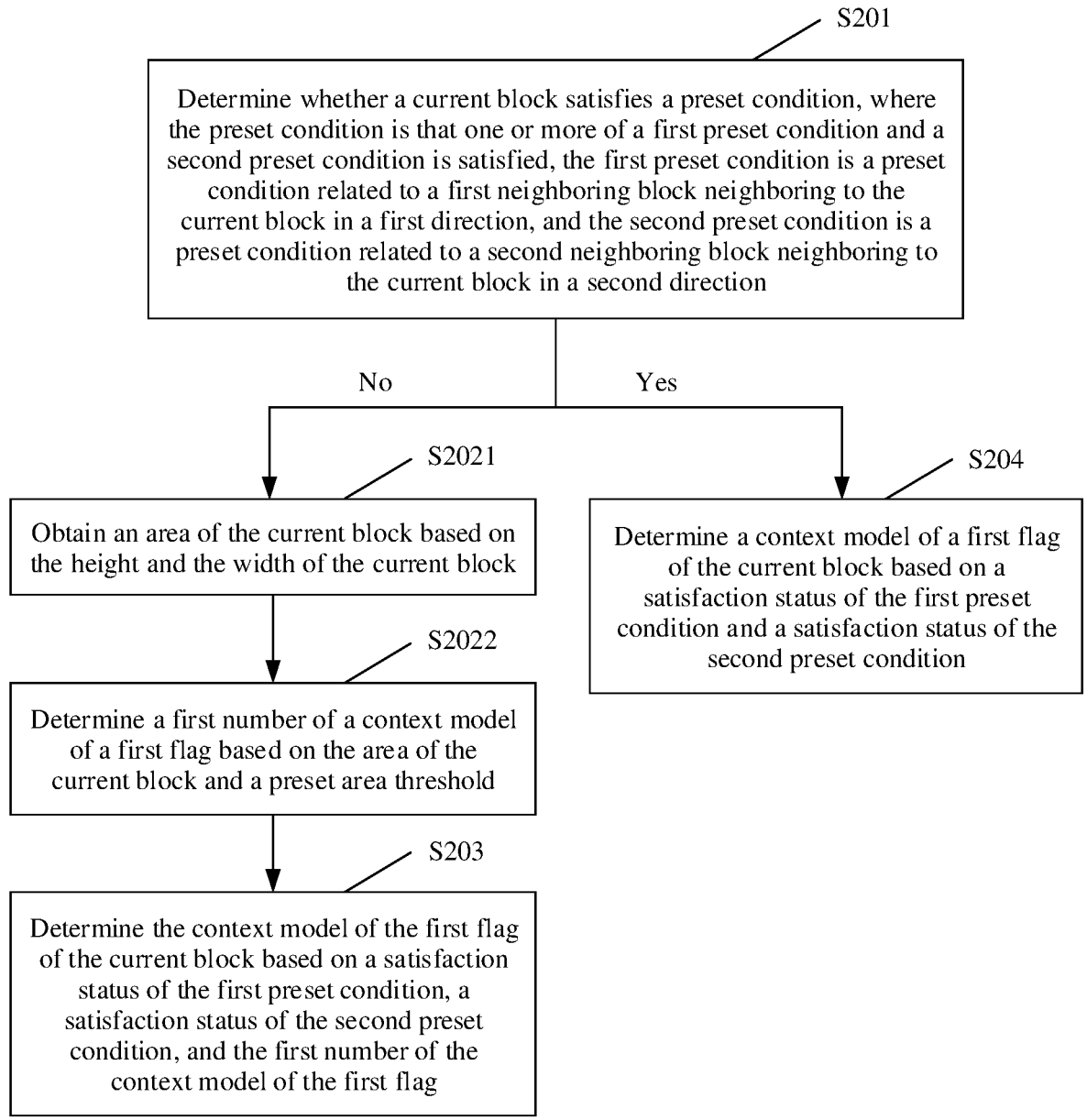
FIG. 10 is a schematic flowchart 4 of a context modeling method for a flag according to an embodiment of this application.

With reference to FIG. 9, as shown in FIG. 10, in this embodiment of this application, S202 may be specifically implemented by using S2021 and S2022.

S2021: Obtain an area of the current block based on the height and the width of the current block.

The area of the current block is a product of the height and the width of the current block.

S2022: Determine the first index of the context model of the first flag based on the area of the current block and a preset area threshold.

In this embodiment of this application, the preset area threshold includes two cases.

In a first case, the preset area threshold includes a first threshold and a second threshold. It may be considered that there is a mapping relationship between the preset area threshold and the first index. For example, the area of the current block is denoted as SizeC, the first threshold is denoted as th1, and the second threshold is denoted as th2. Table 8 is an example of the mapping relationship.

TABLE 8

| Satisfied condition | Subclass model index (ctxSetIdx) |
|---|---|
| SizeC > th2 | 0 |
| th1 ≤ SizeC ≤ th2 | 3 |
| SizeC < th1 | 4 |

In this case, the determining the first index of the context model of the first flag based on the area of the current block and a preset area threshold may specifically include: when the area of the current block is greater than the second threshold, determining that the first index of the context model of the first flag is 0; or when the area of the current block is greater than or equal to the first threshold and less than or equal to the second threshold, determining that the first index of the context model of the first flag is 3; or when the area of the current block is less than the first threshold, determining that the first index of the context model of the first flag is 4.

Optionally, in S2022, the first threshold may be 128, 256, or 64, and the second threshold may be 1024, 2048, or 512. Certainly, the first threshold and the second threshold may alternatively be other values. This is not limited in this embodiment of this application.

It should be noted that the first threshold and the second threshold in S2022 are not related to the first threshold and the second threshold in S1022.

In a second case, the preset area threshold includes a third threshold. It may be considered that there is a mapping relationship between the preset area threshold and the first index. For example, the area of the current block is denoted as SizeC, the third threshold is denoted as th3. Table 9 is an example of the mapping relationship.

TABLE 9

| Satisfied condition | Subclass model index |
|---|---|
| SizeC > th3 | 0 |
| SizeC ≤ th3 | 1 |

In this case, the determining the first index of the context model of the first flag based on the area of the current block and a preset area threshold may specifically include: when the area of the current block is greater than the third threshold, determining that the first index of the context model of the first flag is 0; or when the area of the current block is less than or equal to the third threshold, determining that the first index of the context model of the first flag is 1.

Optionally, in S2022, the third threshold may be 1024, 2048, or 512. Certainly, the third threshold may alternatively be another value. This is not limited in this embodiment of this application.

It should be noted that the third threshold in S2022 is not related to the third threshold in S1022.

S203: Determine the context model of the first flag of the current block based on a satisfaction status of the first preset condition, a satisfaction status of the second preset condition, and the first index of the context model of the first flag.

In this embodiment of this application, there are N context models of the first flag, indices of the N context models are sequentially 0 to N−1, and N is an integer greater than 1.

Specifically, S203 may be implemented by using S2031.

S2031: Determine an index of the context model of the first flag of the current block based on the satisfaction status of the first preset condition, the satisfaction status of the second preset condition, and the first index of the context model of the first flag, where the index of the context model of the first flag satisfies:

$$ctxInc = n\_conL + n\_conA + Y.$$

Herein, ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, and Y represents the first index of the context model of the first flag.

It may be understood that, in this embodiment of this application, when the current block does not satisfy the preset condition, that is, n_conL+n_conA is 0 (the first preset condition is not satisfied, and the second preset condition is not satisfied either), the index of the context model of the first flag may be determined by using the first index, that is, ctxInc=Y (which is the same as a result of ctxInc determined through ctxInc=n_conL+n_conA+Y).

In actual application, for some flags (for example, the foregoing pred_mode_flag), because a probability that both a flag of the first neighboring block of the current block and a flag of the second neighboring block of the current block are 0 is relatively high, a probability that an index of a context model of a flag of the current block is 0 is also relatively high, and the model may be inaccurate. According to the foregoing method, when the current block does not satisfy the preset condition, the first index is added for model optimization, so that decoding efficiency can be improved.

For example, the first flag is cu_skip_flag[x0][y0]. Table 10 and Table 11 show some syntax structures for determining an index of a context model of cu_skip_flag[x0][y0] when the preset condition is not satisfied.

TABLE 10

| Syntax element | condL | condA | ctxSetIdx | ctxInc |
|---|---|---|---|---|
| cu_skip_flag [x0][y0] | cu_skip_flag [xNbL][yNbL]&& available | cu_skip_flag [xNbA][yNbA]&& available | ( SizeC > sizeTh2 ) ? 0: ( ( SizeC > sizeTh1 ) ? 3 : 4) | condA + condL + ctxSetIdx |

TABLE 11

| Syntax element | condL | condA | ctxSetIdx | ctxInc |
|---|---|---|---|---|
| cu_skip_flag [x0][y0] | cu_skip_flag [xNbL][yNbL]&& available | cu_skip_flag [xNbA][yNbA]&& available | (SizeC > sizeTh3 ) ? 0 : 1 | condA + condL + ctxSetIdx |

When the current block satisfies the preset condition, S204 is performed.

S204: Determine a context model of a first flag of the current block based on a satisfaction status of the first preset condition and a satisfaction status of the second preset condition.

Specifically, S204 may be implemented by using S2041.

S2041: Determine an index of the context model of the first flag based on the satisfaction status of the first preset condition and the satisfaction status of the second preset condition, where the index of the context model of the first flag satisfies:

ctxInc=$n\_conL+n\_conA$.

Herein, ctxInc represents the index of the context model of the first flag, n_conL is 1 when the first preset condition is satisfied, or n_conL is 0 when the first preset condition is not satisfied, and n_conA is 1 when the second preset condition is satisfied, or n_conA is 0 when the second preset condition is not satisfied.

For example, the first flag is cu_skip_flag[x0][y0]. Table 12 shows some syntax structures for determining an index of a context model of cu_skip_flag[x0][y0] when the preset condition is satisfied.

TABLE 12

| Syntax element | condL | condA | ctxInc |
| --- | --- | --- | --- |
| cu_skip_flag [x0][y0] | cu_skip_flag[xNbL] [yNbL]&&available | cu_skip_flag[xNbA] [[yNbA]&&available | condA + condL |

In the context modeling method for a flag according to this embodiment of this application, for the current block, whether the current block satisfies the preset condition (the preset condition is at least one of the first preset condition and the second preset condition) is determined. When the current block does not satisfy the preset condition, the context model of the first flag is determined based on the satisfaction status of the first preset condition, the satisfaction status of the second preset condition, and the first index of the context model of the first flag. When the current block satisfies the preset condition, the context model of the first flag is determined based on the satisfaction status of the first preset condition and the satisfaction status of the second preset condition. In this way, accuracy of determining the context model of the flag can be improved to some extent, so that coding performance is improved.

Figure 11:
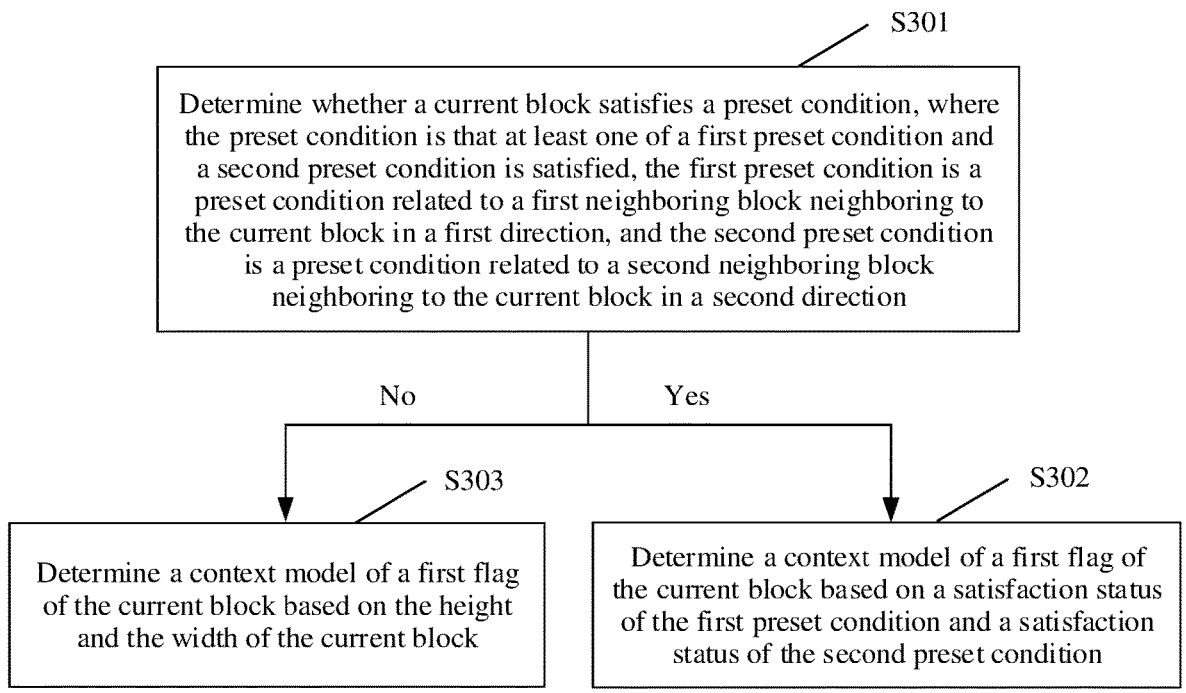
FIG. 11 is a schematic flowchart 5 of a context modeling method for a flag according to an embodiment of this application.

FIG. 11 is a schematic method diagram. A context modeling method for a flag according to an embodiment of this application may include S301 to S303.

S301: Determine whether a current block satisfies a preset condition, where the preset condition is that at least one of a first preset condition and a second preset condition is satisfied, the first preset condition is a preset condition related to a first neighboring block neighboring to the current block in a first direction, and the second preset condition is a preset condition related to a second neighboring block neighboring to the current block in a second direction.

The first direction is perpendicular to the second direction.

Optionally, the first direction may be a horizontal leftward direction, and the second direction may be a vertical upward direction.

It should be noted that, in this embodiment of this application, for related descriptions of the first direction and the second direction, descriptions of the first neighboring block and the second neighboring block, and descriptions of methods for determining the first neighboring block and the second neighboring block, refer to the specific descriptions in S101. Details are not described herein again.

Similar to that in S101, the first preset condition is the preset condition related to the first neighboring block. Specifically, the first preset condition means that the first neighboring block of the current block is available and a first flag of the first neighboring block is 1. Whether the first preset condition is satisfied includes: The first preset condition is satisfied when the first neighboring block of the current block is available and the first flag of the first neighboring block is 1, or the first preset condition is not satisfied when the first neighboring block of the current block is not available or the first flag of the first neighboring block is not 1. The second preset condition is the preset condition related to the second neighboring block. Specifically, the second preset condition means that the second neighboring block of the current block is available and a first flag of the second neighboring block is 1. Whether the second preset condition is satisfied includes: The second preset condition is satisfied when the second neighboring block of the current block is available and the first flag of the second neighboring block is 1, or the second preset condition is not satisfied when the second neighboring block of the current block is not available or the first flag of the second neighboring block is not 1.

In this embodiment of this application, the preset condition is that the at least one of the first preset condition and the second preset condition is satisfied. It may be understood that when one or both of the first preset condition and the second preset condition is/are satisfied, the current block satisfies the preset condition. Otherwise (that is, when neither the first preset condition nor the second preset condition is satisfied), the current block does not satisfy the preset condition.

When the current block satisfies the preset condition, S302 is performed.

S302: Determine a context model of a first flag of the current block based on a satisfaction status of the first preset condition and a satisfaction status of the second preset condition.

For a detailed description of S302, refer to the related description of S204 (including S2041) in the foregoing embodiment. Details are not described herein again.

When the current block does not satisfy the preset condition, S303 is performed.

S303: Determine a context model of a first flag of the current block based on the height and the width of the current block.

Figure 12:
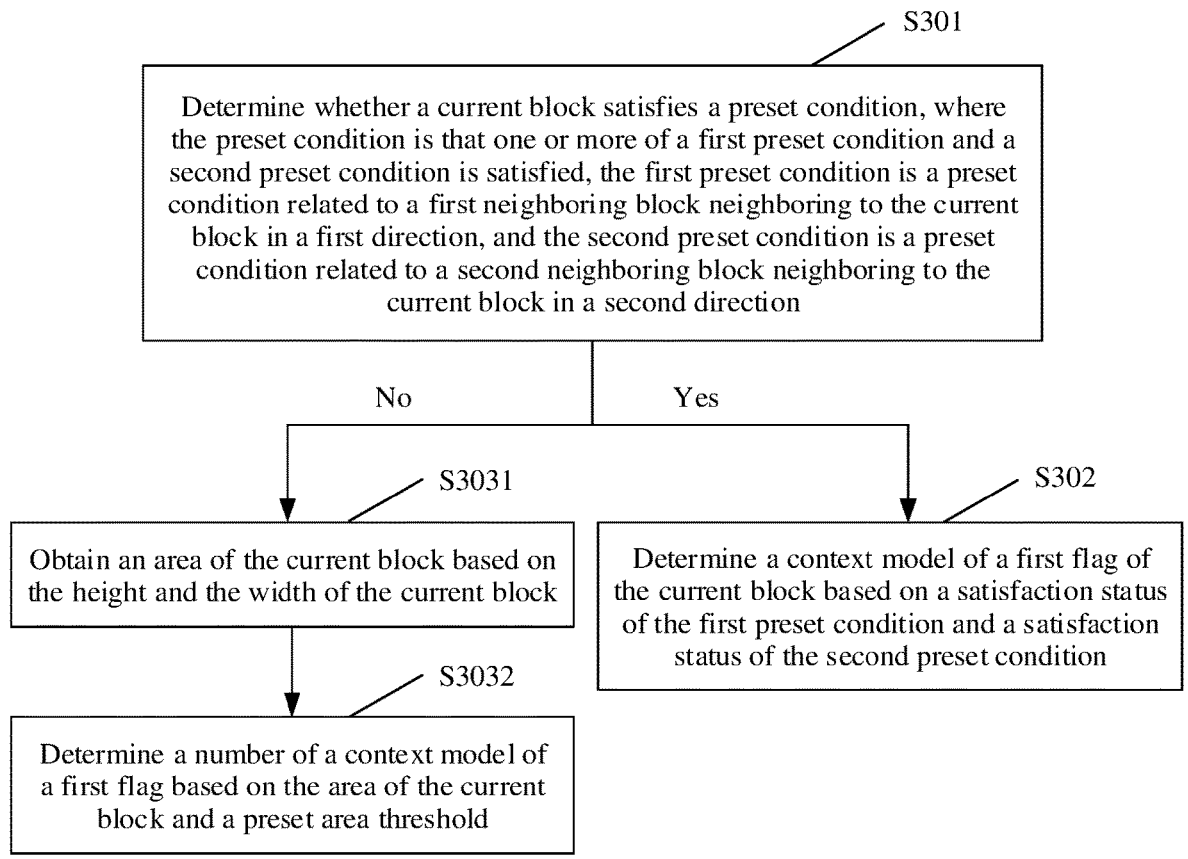
FIG. 12 is a schematic flowchart 6 of a context modeling method for a flag according to an embodiment of this application.

With reference to FIG. 11, as shown in FIG. 12, in this embodiment of this application, S303 may be specifically implemented by using S3031 and S3032.

S3031: Obtain an area of the current block based on the height and the width of the current block.

The area of the current block is a product of the height and the width of the current block.

S3032: Determine an index of the context model of the first flag based on the area of the current block and a preset area threshold.

For detailed descriptions of S3031 and S3032, refer to the related descriptions of S2021 and S2022 in the foregoing embodiment. Details are not described herein again.

In the context modeling method for a flag according to this embodiment of this application, for the current block, whether the current block satisfies the preset condition (the preset condition is at least one of the first preset condition and the second preset condition) is determined. When the current block satisfies the preset condition, the context model of the first flag is determined based on the satisfaction status of the first preset condition and the satisfaction status of the second preset condition. When the current block does not satisfy the preset condition, the context model of the first flag is determined based on the height and the width of the current block. In this way, accuracy of determining the context model of the flag can be improved to some extent, so that coding performance is improved.

Figure 13:
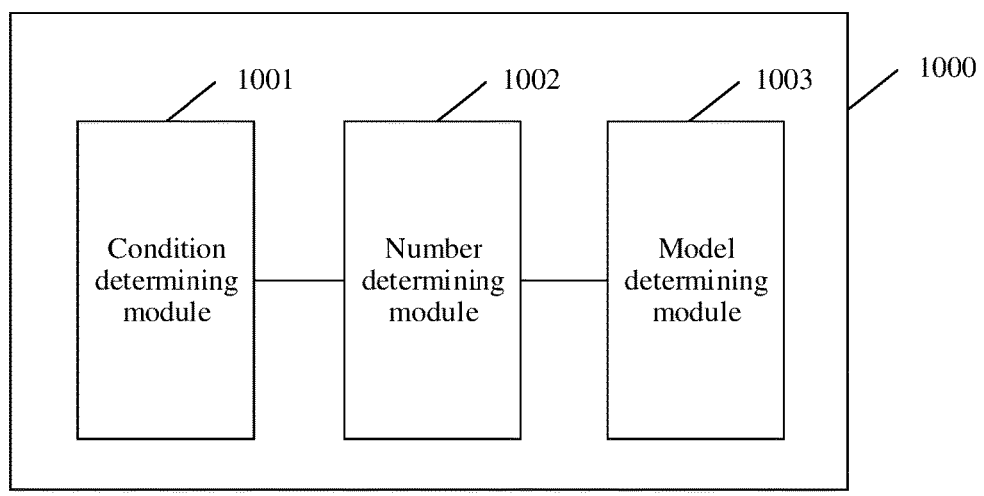
FIG. 13 is a structural block diagram of a context modeling apparatus for a flag according to an embodiment of this application.

Based on a same inventive concept as the foregoing method, as shown in FIG. 13, an embodiment of this application further provides a context modeling apparatus 1000 for a flag. The context modeling apparatus 1000 for a flag includes a condition determining module 1001, an index determining module 1002, and a model determining module 1003.

The condition determining module 1001 is configured to determine whether a first preset condition is satisfied and whether a second preset condition is satisfied, where the first preset condition is a preset condition related to a first neighboring block neighboring to the current block in a first direction, the second preset condition is a preset condition related to a second neighboring block neighboring to the current block in a second direction, and the first direction is perpendicular to the second direction.

Optionally, the first direction is a horizontal leftward direction, and the second direction is a vertical upward direction.

In this embodiment of this application, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

The index determining module 1002 is configured to determine a subclass index of a context model of a first flag of the current block based on the height and the width of the current block. The first flag includes one of the following flags: a skip mode flag, a prediction mode flag, a merge mode flag, an affine merge mode flag, an affine advanced motion vector prediction mode, or an adaptive motion vector resolution mode.

The model determining module is configured to determine the context model of the first flag of the current block based on a satisfaction status of the first preset condition, a satisfaction status of the second preset condition, and the subclass index of the context model of the first flag. There are N context models of the first flag, indices of the N context models are sequentially 0 to N−1, and N is an integer greater than 1.

In a possible implementation, the model determining module 1003 is specifically configured to determine an index of the context model of the first flag of the current block based on the satisfaction status of the first preset condition, the satisfaction status of the second preset condition, and the subclass index of the context model of the first flag, where the index of the context model of the first flag satisfies: ctxInc=n_conL+n_conA+X*a, where ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, X represents the subclass index of the context model of the first flag, a is a positive integer, and * represents multiplication.

In a possible implementation, the index determining module 1002 is specifically configured to: obtain an area of the current block based on the height and the width of the current block; and determine the subclass index of the context model of the first flag based on the area of the current block and a preset area threshold.

The preset area threshold includes a first threshold and a second threshold, and the index determining module 1002 is specifically configured to: when the area of the current block is greater than the second threshold, determine that the subclass index of the context model of the first flag is 0; or when the area of the current block is greater than or equal to the first threshold and less than or equal to the second threshold, determine that the subclass index of the context model of the first flag is 1; or when the area of the current block is less than the first threshold, determine that the subclass index of the context model of the first flag is 2.

The preset area threshold includes a third threshold, and the index determining module is specifically configured to: when the area of the current block is greater than the third threshold, determine that the subclass index of the context model of the first flag is 0; or when the area of the current block is less than or equal to the third threshold, determine that the subclass index of the context model of the first flag is 1.

It should be noted that the condition determining module 1001, the index determining module 1002, and the model determining module 1003 may be used in a context modeling (that is, entropy encoding or entropy decoding) process of a flag on an encoder side or a decoder side. Specifically, on the encoder side, these modules may be used in the entropy encoding unit 270 of the foregoing encoder 20. On the decoder side, these modules may be used in the entropy decoding unit 304 of the foregoing decoder 30.

It should be further noted that for specific implementation processes of the condition determining module 1001, the index determining module 1002, and the model determining module 1003, refer to the detailed description of the embodiment corresponding to FIG. 6 or FIG. 8. For brevity of the specification, details are not described herein.

Figure 14:
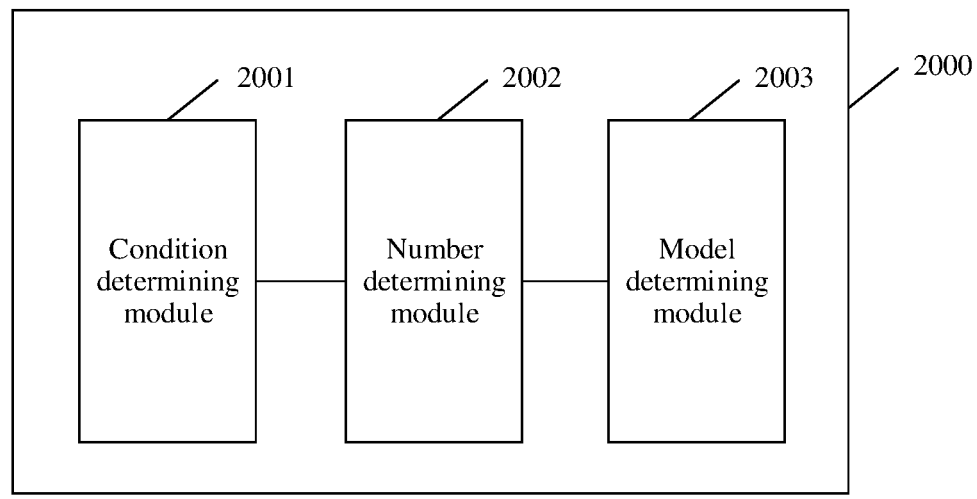
FIG. 14 is a structural block diagram of another context modeling apparatus for a flag according to an embodiment of this application.

Based on a same inventive concept as the foregoing method, as shown in FIG. 14, an embodiment of this application further provides a context modeling apparatus 2000 for a flag. The context modeling apparatus 2000 for a flag includes a condition determining module 2001, an index determining module 2002, and a model determining module 2003.

The condition determining module 2001 is configured to determine whether a current block satisfies a preset condition, where the preset condition is at least one of a first preset condition and a second preset condition, the first preset condition is a preset condition related to a first neighboring block neighboring to the current block in a first direction, the second preset condition is a preset condition related to a second neighboring block neighboring to the current block in a second direction, and the first direction is perpendicular to the second direction.

Optionally, the first direction is a horizontal leftward direction, and the second direction is a vertical upward direction.

In this embodiment of this application, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

The index determining module 2002 is configured to: if the current block does not satisfy the preset condition, determine a first index of a context model of a first flag of the current block based on the height and the width of the current block. The first flag includes one of the following flags: a skip mode flag, a prediction mode flag, a merge mode flag, an affine merge mode flag, an affine advanced motion vector prediction mode, or an adaptive motion vector resolution mode.

The model determining module 2003 is configured to determine the context model of the first flag of the current block based on a satisfaction status of the first preset condition, a satisfaction status of the second preset condition, and the first index of the context model of the first flag.

The model determining module 2003 is alternatively configured to: if the current block satisfies the preset condition, determine a context model of a first flag of the current block based on a satisfaction status of the first preset condition and a satisfaction status of the second preset condition. There are N context models of the first flag, indices of the N context models are sequentially 0 to N−1, and N is an integer greater than 1.

In a possible implementation, the model determining module 2003 is specifically configured to determine an index of the context model of the first flag of the current block based on the satisfaction status of the first preset condition, the satisfaction status of the second preset condition, and the first index of the context model of the first flag, where the index of the context model of the first flag satisfies: ctxInc=n_conL+n_conA+Y, where ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, and Y represents the first index of the context model of the first flag.

In an optional implementation, the model determining module 2003 is specifically configured to determine an index of the context model of the first flag based on the satisfaction status of the first preset condition and the satisfaction status of the second preset condition, where the index of the context model of the first flag satisfies: ctxInc=n_conL+n_conA, where ctxInc represents the index of the context model of the first flag, n_conL is 1 when the first preset condition is satisfied, or n_conL is 0 when the first preset condition is not satisfied, and n_conA is 1 when the second preset condition is satisfied, or n_conA is 0 when the second preset condition is not satisfied.

In a possible implementation, the index determining module 2003 is specifically configured to: obtain an area of the current block based on the height and the width of the current block; and determine the first index of the context model of the first flag based on the area of the current block and a preset area threshold.

The preset area threshold includes a first threshold and a second threshold, and the index determining module is specifically configured to: when the area of the current block is greater than the second threshold, determine that the first index of the context model of the first flag is 0; or when the area of the current block is greater than or equal to the first threshold and less than or equal to the second threshold, determine that the first index of the context model of the first flag is 3; or when the area of the current block is less than the first threshold, determine that the first index of the context model of the first flag is 4.

The preset area threshold includes a third threshold, and the index determining module is specifically configured to: when the area of the current block is greater than the third threshold, determine that the first index of the context model of the first flag is 0; or when the area of the current block is less than or equal to the third threshold, determine that the first index of the context model of the first flag is 1.

It should be noted that the condition determining module 2001, the index determining module 2002, and the model determining module 2003 may be used in a context modeling (that is, entropy encoding or entropy decoding) process of a flag on an encoder side or a decoder side. Specifically, on the encoder side, these modules may be used in the entropy encoding unit 270 of the foregoing encoder 20. On the decoder side, these modules may be used in the entropy decoding unit 304 of the foregoing decoder 30.

It should be further noted that for specific implementation processes of the condition determining module 2001, the index determining module 2002, and the model determining module 2003, refer to the detailed description of the embodiment corresponding to FIG. 9 or FIG. 10. For brevity of the specification, details are not described herein.

Figure 15:
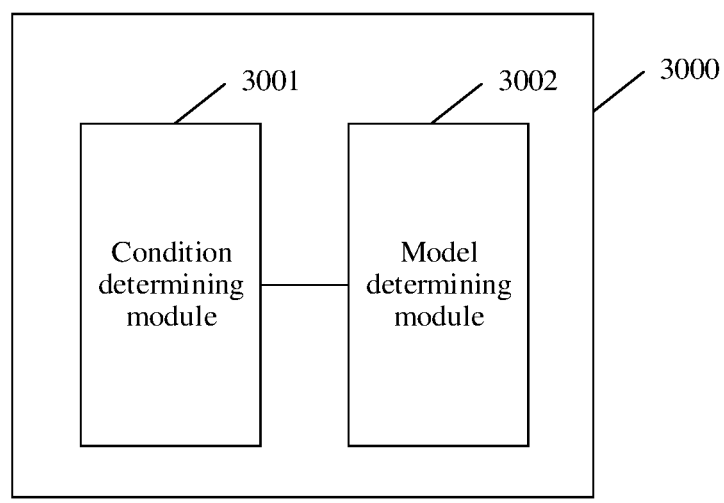
FIG. 15 is a structural block diagram of still another context modeling apparatus for a flag according to an embodiment of this application.

Based on a same inventive concept as the foregoing method, as shown in FIG. 15, an embodiment of this application further provides a context modeling apparatus 3000 for a flag. The context modeling apparatus 3000 for a flag includes a condition determining module 3001 and a model determining module 3002.

The condition determining module 3001 is configured to determine whether a current block satisfies a preset condition, where the preset condition is that at least one of a first preset condition and a second preset condition is satisfied, the first preset condition is a preset condition related to a first neighboring block neighboring to the current block in a first direction, the second preset condition is a preset condition related to a second neighboring block neighboring to the current block in a second direction, and the first direction is perpendicular to the second direction.

Optionally, the first direction is a horizontal leftward direction, and the second direction is a vertical upward direction.

In this embodiment of this application, the first preset condition is satisfied when the first neighboring block of the current block is available and a first flag of the first neighboring block is 1, or the first preset condition is not satisfied when the first neighboring block of the current block is not available or a first flag of the first neighboring block is not 1; and the second preset condition is satisfied when the second neighboring block of the current block is available and a first flag of the second neighboring block is 1, or the second preset condition is not satisfied when the second neighboring block of the current block is not available or a first flag of the second neighboring block is not 1.

The model determining module 3002 is configured to: if the current block satisfies the preset condition, determine a context model of a first flag of the current block based on a satisfaction status of the first preset condition and a satisfaction status of the second preset condition. Alternatively, the model determining module 3002 is configured to: if the current block does not satisfy the preset condition, determine a context model of a first flag of the current block based on the height and the width of the current block. The first flag includes one of the following flags: a skip mode flag, a prediction mode flag, a merge mode flag, an affine merge mode flag, an affine advanced motion vector prediction mode, or an adaptive motion vector resolution mode.

In a possible implementation, the model determining module 3002 is specifically configured to: obtain an area of the current block based on the height and the width of the current block; and determine an index of the context model of the first flag based on the area of the current block and a preset area threshold.

The preset area threshold includes a first threshold and a second threshold. In this case, the model determining module 3002 is specifically configured to: when the area of the current block is greater than the second threshold, determine that the index of the context model of the first flag is 0; or when the area of the current block is greater than or equal to the first threshold and less than or equal to the second threshold, determine that the index of the context model of the first flag is 3; or when the area of the current block is less than the first threshold, determine that the index of the context model of the first flag is 4.

It should be noted that the condition determining module 3001 and the model determining module 3002 may be used in a context modeling (that is, entropy encoding or entropy decoding) process of a flag on an encoder side or a decoder side. Specifically, on the encoder side, these modules may be used in the entropy encoding unit 270 of the foregoing encoder 20. On the decoder side, these modules may be used in the entropy decoding unit 304 of the foregoing decoder 30.

It should be further noted that for specific implementation processes of the condition determining module 3001 and the model determining module 3002, refer to the detailed description of the embodiment corresponding to FIG. 11 or FIG. 12. For brevity of the specification, details are not described herein.

A person skilled in the art can understand that the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in each embodiment have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, for a current block, whether a first preset condition is satisfied, to determine a satisfaction status of the first preset condition, wherein the first preset condition is a preset condition related to a first neighboring block that neighbors the current block in a first direction;
   determining, for the current block, whether a second preset condition is satisfied, to determine a satisfaction status of the second preset condition, wherein the second preset condition is a preset condition related to a second neighboring block that neighbors to the current block in a second direction, and the first direction is perpendicular to the second direction;
   determining a subclass index of a context model of a first flag of the current block based on a height of the current block and a width of the current block; and
   determining the context model of the first flag of the current block based on the satisfaction status of the first preset condition, the satisfaction status of the second preset condition, and the subclass index of the context model of the first flag, the determining of the context model of the first flag comprising:
      determining an index of the context model of the first flag of the current block based on the satisfaction status of the first preset condition, the satisfaction status of the second preset condition, and the subclass index of the context model of the first flag, wherein the index of the context model of the first flag satisfies: $ctxInc=n\_conL+n\_conA+Y$, wherein ctxInc represents the index of the context model of the first flag, $n\_conL$ is 1 when the first preset condition is satisfied, or $n\_conL$ is 0 when the first preset condition is not satisfied, $n\_conA$ is 1 when the second preset condition is satisfied, or $n\_conA$ is 0 when the second preset condition is not satisfied, Y represents the subclass index of the context model of the first flag, and Y is dependent on a value of a size of the current block.

2. The method according to claim 1, wherein:
   the first preset condition is satisfied when the first neighboring block of the current block is available and a first flag of the first neighboring block is 1, or the first preset condition is not satisfied when the first neighboring block of the current block is not available or a first flag of the first neighboring block is not 1; and
   the second preset condition is satisfied when the second neighboring block of the current block is available and a first flag of the second neighboring block is 1, or the second preset condition is not satisfied when the second neighboring block of the current block is not available or a first flag of the second neighboring block is not 1.

3. The method according to claim 1, wherein determining the subclass index of the context model of the first flag of the current block based on the height of the current block and the width of the current block comprises:
   obtaining an area of the current block based on the height of the current block and the width of the current block; and
   determining the subclass index of the context model of the first flag based on the area of the current block and a preset area threshold.

4. The method according to claim 3, wherein the preset area threshold comprises a first threshold and a second threshold, the second threshold is greater than the first threshold, and determining the subclass index of the context model of the first flag based on the area of the current block and the preset area threshold comprises:
   when the area of the current block is greater than the second threshold, determining that the subclass index of the context model of the first flag is 0; or
   when the area of the current block is greater than or equal to the first threshold and less than or equal to the second threshold, determining that the subclass index of the context model of the first flag is 1; or
   when the area of the current block is less than the first threshold, determining that the subclass index of the context model of the first flag is 2.

5. The method according to claim 3, wherein the preset area threshold comprises a first threshold, and determining the subclass index of the context model of the first flag based on the area of the current block and the preset area threshold comprises:
   when the area of the current block is greater than the first threshold, determining that the subclass index of the context model of the first flag is 0; or
   when the area of the current block is less than or equal to the first threshold, determining that the subclass index of the context model of the first flag is 1.

6. The method according to claim 1, wherein the first flag comprises:
   a skip mode flag, a prediction mode flag, a merge mode flag, an affine merge mode flag, an affine advanced motion vector prediction mode flag, or an adaptive motion vector resolution mode flag.

7. The method according to claim 1, wherein the first direction is a horizontal leftward direction, and the second direction is a vertical upward direction.

8. A apparatus, comprising:
   a non-transitory memory storing computer-executable instructions; and
   at least one processor operatively coupled to the non-transitory memory, the at least one processor being configured to execute the computer-executable instructions to:
      determine whether a first preset condition is satisfied, to determine a satisfaction status of the first preset condition, wherein the first preset condition is a preset condition related to a first neighboring block that neighbors a current block in a first direction;
      determine whether a second preset condition is satisfied, to determine a satisfaction status of the second preset condition, wherein the second preset condition is a preset condition related to a second neighboring block that neighbors the current block in a second direction, and the first direction is perpendicular to the second direction;
      determine a subclass index of a context model of a first flag of the current block based on a height of the current block and a width of the current block; and
      determine the context model of the first flag of the current block based on the satisfaction status of the first preset condition, the satisfaction status of the second preset condition, and the subclass index of the context model of the first flag, the determining of the context model of the first flag comprising:
         determining an index of the context model of the first flag of the current block based on the satisfaction status of the first preset condition, the satisfaction status of the second preset condition, and the subclass index of the context model of the first flag, wherein the index of the context model of the first flag satisfies: $ctxInc=n\_conL+n\_conA+Y$, wherein ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, Y represents the subclass index of the context model of the first flag, and Y is dependent on a value of a size of the current block.

9. The apparatus according to claim 8, wherein:
the first preset condition is satisfied when the first neighboring block of the current block is available and a first flag of the first neighboring block is 1, or the first preset condition is not satisfied when the first neighboring block of the current block is not available or a first flag of the first neighboring block is not 1; and
the second preset condition is satisfied when the second neighboring block of the current block is available and a first flag of the second neighboring block is 1, or the second preset condition is not satisfied when the second neighboring block of the current block is not available or a first flag of the second neighboring block is not 1.

10. The apparatus according to claim 8, wherein the at least one processor is further configured to execute the computer-executable instructions to:
obtain an area of the current block based on the height of the current block and the width of the current block; and
determine the subclass index of the context model of the first flag based on the area of the current block and a preset area threshold.

11. The apparatus according to claim 10, wherein the preset area threshold comprises a first threshold and a second threshold, and the at least one processor is configured to execute the computer-executable instructions to:
when the area of the current block is greater than the second threshold, determine that the subclass index of the context model of the first flag is 0; or
when the area of the current block is greater than or equal to the first threshold and less than or equal to the second threshold, determine that the subclass index of the context model of the first flag is 1; or
when the area of the current block is less than the first threshold, determine that the subclass index of the context model of the first flag is 2.

12. The apparatus according to claim 10, wherein the preset area threshold comprises a first threshold, and the at least one processor is configured to execute the computer-executable instructions to:
when the area of the current block is greater than the first threshold, determine that the subclass index of the context model of the first flag is 0; or
when the area of the current block is less than or equal to the first threshold, determine that the subclass index of the context model of the first flag is 1.

13. The apparatus according to claim 8, wherein the first flag comprises:
a skip mode flag, a prediction mode flag, a merge mode flag, an affine merge mode flag, an affine advanced motion vector prediction mode flag, or an adaptive motion vector resolution mode flag.

14. The apparatus according to claim 8, wherein the first direction is a horizontal leftward direction, and the second direction is a vertical upward direction.

15. A computer program product comprising computer-executable instructions stored on a non-transitory computer-readable storage medium that, when executed by at least one processor, cause an apparatus to:
determine whether a first preset condition is satisfied, to determine a satisfaction status of the first preset condition, wherein the first preset condition is a preset condition related to a first neighboring block that neighbors a current block in a first direction;
determine whether a second preset condition is satisfied, to determine a satisfaction status of the second preset condition, wherein the second preset condition is a preset condition related to a second neighboring block that neighbors the current block in a second direction, and the first direction is perpendicular to the second direction;
determine a subclass index of a context model of a first flag of the current block based on a height of the current block and a width of the current block; and
determine the context model of the first flag of the current block based on the satisfaction status of the first preset condition, the satisfaction status of the second preset condition, and the subclass index of the context model of the first flag, the determining of the context model of the first flag comprising:
determining an index of the context model of the first flag of the current block based on the satisfaction status of the first preset condition, the satisfaction status of the second preset condition, and the subclass index of the context model of the first flag, wherein the index of the context model of the first flag satisfies: ctxInc=n_conL+n_conA+Y, wherein ctxInc represents the index of the context model of the first flag, n_conL is 1 when the first preset condition is satisfied, or n_conL is 0 when the first preset condition is not satisfied, n_conA is 1 when the second preset condition is satisfied, or n_conA is 0 when the second preset condition is not satisfied, Y represents the subclass index of the context model of the first flag, and Y is dependent on a value of a size of the current block.

16. The computer program product according to claim 15, wherein:
the first preset condition is satisfied when the first neighboring block of the current block is available and a first flag of the first neighboring block is 1, or the first preset condition is not satisfied when the first neighboring block of the current block is not available or a first flag of the first neighboring block is not 1; and
the second preset condition is satisfied when the second neighboring block of the current block is available and a first flag of the second neighboring block is 1, or the second preset condition is not satisfied when the second neighboring block of the current block is not available or a first flag of the second neighboring block is not 1.

17. The computer program product according to claim 15, wherein the computer-executable instructions, when executed by the at least one processor, further cause the apparatus to:
obtain an area of the current block based on the height of the current block and the width of the current block; and
determine the subclass index of the context model of the first flag based on the area of the current block and a preset area threshold.

18. The computer program product according to claim 17, wherein the preset area threshold comprises a first threshold and a second threshold, the second threshold is greater than the first threshold, and determining the subclass index of the context model of the first flag based on the area of the current block and the preset area threshold comprises:
- when the area of the current block is greater than the second threshold, determining that the subclass index of the context model of the first flag is 0; or
- when the area of the current block is greater than or equal to the first threshold and less than or equal to the second threshold, determining that the subclass index of the context model of the first flag is 1; or
- when the area of the current block is less than the first threshold, determining that the subclass index of the context model of the first flag is 2.

19. The computer program product according to claim 17, wherein the preset area threshold comprises a first threshold, and determining the subclass index of the context model of the first flag based on the area of the current block and the preset area threshold comprises:
- when the area of the current block is greater than the first threshold, determining that the subclass index of the context model of the first flag is 0; or
- when the area of the current block is less than or equal to the first threshold, determining that the subclass index of the context model of the first flag is 1.

20. The computer program product according to claim 15, wherein the first flag comprises:
- a skip mode flag, a prediction mode flag, a merge mode flag, an affine merge mode flag, an affine advanced motion vector prediction mode flag, or an adaptive motion vector resolution mode flag.

\* \* \* \* \*